United States Patent
Nguyen et al.

(10) Patent No.: US 7,168,089 B2
(45) Date of Patent: Jan. 23, 2007

(54) SECURED VIRTUAL NETWORK IN A GAMING ENVIRONMENT

(75) Inventors: Binh T. Nguyen, Reno, NV (US); Michael M. Oberberger, Reno, NV (US); Gregory Hopkins Parrott, Reno, NV (US)

(73) Assignee: IGT, Reno, NV (US)

( * ) Notice: Subject to any disclaimer, the term of this patent is extended or adjusted under 35 U.S.C. 154(b) by 931 days.

(21) Appl. No.: 10/116,424

(22) Filed: Apr. 3, 2002

(65) Prior Publication Data

US 2002/0116615 A1 Aug. 22, 2002

Related U.S. Application Data

(63) Continuation-in-part of application No. 09/732,650, filed on Dec. 7, 2000.

(51) Int. Cl.
*H04L 9/00* (2006.01)
*G06F 15/16* (2006.01)
*A63F 9/24* (2006.01)
*H04K 1/00* (2006.01)

(52) U.S. Cl. ............................ 726/4; 463/29; 713/168; 713/176; 380/251

(58) Field of Classification Search .................. None
See application file for complete search history.

(56) References Cited

U.S. PATENT DOCUMENTS

| | | | |
|---|---|---|---|
| 3,931,504 A | 1/1976 | Jacoby | 235/153 |
| 4,430,728 A | 2/1984 | Beitel et al. | 364/900 |
| 4,454,594 A | 6/1984 | Heffron et al. | 364/900 |
| 5,136,644 A | 8/1992 | Audebert et al. | |
| 5,155,837 A | 10/1992 | Liu et al. | |
| 5,410,703 A | 4/1995 | Nilsson et al. | |
| 5,421,009 A | 5/1995 | Platt | |
| 5,421,017 A | 5/1995 | Scholz et al. | |
| 5,473,772 A | 12/1995 | Halliwell et al. | |

(Continued)

FOREIGN PATENT DOCUMENTS

EP 0 689 325 6/1995

(Continued)

OTHER PUBLICATIONS

Hiroaki Higaki, 8 page document entitled "Group Communication Algorithm for Dynamically Updating in Distributed Systems" Copyright 1994 IEEE International Conference On Parallel and Distributed Systems (pp. 56-62) 08-8186-655-Jun. 1994, higaki@sdesun.slab.ntt.jp.

(Continued)

Primary Examiner—Christopher Revak
(74) Attorney, Agent, or Firm—Beyer Weaver & Thomas LLP

(57) ABSTRACT

A disclosed gaming machine may securely communicate with devices over a public network such as the Internet. The gaming machine utilizes a combination of symmetric and asymmetric encryption that allows a single gaming machine to securely communicate with a remote server using a public network. The secure communication methods may be used to transfer gaming software and gaming information between two gaming devices, such as between a game server and a gaming machine. For regulatory and tracking purposes, the transfer of gaming software between the two gaming devices may be authorized and monitored by a software authorization agent.

136 Claims, 16 Drawing Sheets

U.S. PATENT DOCUMENTS

| | | | |
|---|---|---|---|
| 5,555,418 A | 9/1996 | Nilsson et al. | |
| 5,643,086 A * | 7/1997 | Alcorn et al. | 463/29 |
| 5,654,746 A | 8/1997 | McMullan, Jr. et al. | |
| 5,671,412 A | 9/1997 | Christiano | |
| 5,682,533 A | 10/1997 | Siljestroemer | |
| 5,715,403 A | 2/1998 | Stefik | |
| 5,715,462 A | 2/1998 | Iwamoto et al. | |
| 5,759,102 A | 6/1998 | Pease et al. | |
| 5,761,647 A | 6/1998 | Boushy | 705/10 |
| 5,762,552 A | 6/1998 | Vuong et al. | 463/25 |
| 5,768,382 A | 6/1998 | Schneier et al. | 380/23 |
| 5,770,533 A | 6/1998 | Franchi | 463/42 |
| 5,779,545 A | 7/1998 | Berg et al. | 463/22 |
| 5,836,817 A | 11/1998 | Acres et al. | 463/26 |
| 5,845,077 A | 12/1998 | Fawcett | |
| 5,845,090 A | 12/1998 | Collins et al. | |
| 5,848,064 A | 12/1998 | Cowan | |
| 5,851,149 A | 12/1998 | Xidos et al. | 463/42 |
| 5,870,723 A | 2/1999 | Pare, Jr. et al. | |
| 5,885,158 A | 3/1999 | Torango et al. | |
| 5,896,566 A | 4/1999 | Averbuch et al. | |
| 5,905,523 A | 5/1999 | Woodfield et al. | |
| 5,925,127 A | 7/1999 | Ahmad | |
| 5,970,143 A | 10/1999 | Schneier et al. | |
| 5,999,808 A | 12/1999 | LaDue | 455/412 |
| 6,002,772 A | 12/1999 | Saito | |
| 6,006,034 A | 12/1999 | Heath et al. | |
| 6,029,046 A | 2/2000 | Khan et al. | |
| 6,047,128 A | 4/2000 | Zander | |
| 6,052,512 A | 4/2000 | Peterson et al. | |
| 6,099,408 A | 8/2000 | Schneier et al. | 463/29 |
| 6,104,815 A | 8/2000 | Alcorn et al. | 380/251 |
| 6,106,396 A * | 8/2000 | Alcorn et al. | 463/29 |
| 6,125,185 A | 9/2000 | Boesch | |
| 6,149,522 A | 11/2000 | Alcorn et al. | 463/29 |
| 6,154,878 A | 11/2000 | Saboff | |
| 6,165,072 A | 12/2000 | Davis et al. | 463/29 |
| 6,169,976 B1 | 1/2001 | Colosso | |
| 6,178,510 B1 | 1/2001 | O'Connor et al. | 713/201 |
| 6,253,374 B1 | 6/2001 | Dresevic et al. | 717/11 |
| 6,270,410 B1 | 8/2001 | DeMar et al. | 463/20 |
| 6,285,868 B1 | 9/2001 | LaDue | 455/410 |
| 6,285,886 B1 | 9/2001 | Kamel et al. | 455/522 |
| 6,317,827 B1 | 11/2001 | Cooper | |
| 6,364,769 B1 | 4/2002 | Weiss et al. | 463/29 |
| 6,368,219 B1 | 4/2002 | Szrek et al. | 463/42 |
| 6,446,257 B1 | 9/2002 | Pradhan et al. | 717/154 |
| 6,449,687 B1 | 9/2002 | Moriya | 711/112 |
| 6,453,319 B1 | 9/2002 | Mattis et al. | 707/100 |
| 6,454,648 B1 | 9/2002 | Kelly et al. | 463/16 |
| 6,508,709 B1 | 1/2003 | Karmarkar | 463/43 |
| 6,805,634 B1 * | 10/2004 | Wells et al. | 463/42 |
| 2002/0045477 A1 | 4/2002 | Dabrowski | 463/29 |
| 2002/0049909 A1 | 4/2002 | Jackson et al. | 713/188 |
| 2002/0071557 A1 | 6/2002 | Nguyen | 380/251 |
| 2002/0137217 A1 | 9/2002 | Rowe | |
| 2002/0155887 A1 | 10/2002 | Criss-Puszkiewicz et al. | |
| 2003/0054880 A1 | 3/2003 | Lam et al. | |
| 2003/0064771 A1 | 4/2003 | Morrow et al. | |
| 2003/0188306 A1 | 10/2003 | Harris et al. | |
| 2004/0002385 A1 | 1/2004 | Nguyen | |

FOREIGN PATENT DOCUMENTS

| | | |
|---|---|---|
| EP | 0 706 275 | 4/1996 |
| EP | 0715245 A1 | 6/1996 |
| EP | 0744786 | 11/1996 |
| EP | 0841 615 | 5/1998 |
| EP | 0 905 614 | 3/1999 |
| EP | 1 004 970 | 5/2000 |
| EP | 1061430 A1 | 12/2000 |
| EP | 1074955 A2 | 2/2001 |
| WO | WO 95/24689 | 9/1995 |
| WO | WO 96/00950 | 1/1996 |
| WO | WO 99/01188 | 1/1999 |
| WO | WO 01/20424 A2 | 3/2001 |
| WO | 02/05229 A2 | 1/2002 |
| WO | WO 03/085613 | 10/2003 |

OTHER PUBLICATIONS

Steffen Hauptmann, et al., 12 page document entitled "On-line Maintenance With On-The-Fly Software Replacement" Copyright 1996 IEEE Proceedings, Third International Conference On Configurable Distributed Systems, (pp. 70-80) 0-8186-7395-Aug. 1996.

Hiroaki Higaki, 9 page document entitled "Extended Group Communication Algorithm For Updating Distributed Programs" Copyright 1996, IEEE, International Conference ON Parallel and Distributed Systems, 0-8186-7267-Jun. 1996, , hig@takilab.k.dendai.as.jp.

International Search Report and Written Opinion dated Jul. 19, 2006 from corresponding PCT Application No. PCT/US2006/008785 (11 pages).

* cited by examiner

SECURED VIRTUAL NETWORK IN A GAMING ENVIRONMENT

CROSS-REFERENCE TO RELATED APPLICATIONS

This application is a continuation-in-part of U.S. patent application Ser. No. 09/732,650 entitled "SECURED VIRTUAL NETWORK IN A GAMING ENVIRONMENT", filed Dec. 7, 2000, naming Binh Nguyen as inventor, which is incorporated herein by reference in its entirety for all purposes.

BACKGROUND OF THE INVENTION

This invention relates to game playing services for gaming machines such as slot machines and video poker machines. More particularly, the present invention relates to providing methods of communication for game services such as licensing and accounting on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, such as bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

The operations described above may be carried out on the gaming machine when the gaming machine is operating as a "stand alone" unit or linked in a network of some type to a group of gaming machines. As technology in the gaming industry progresses, more and more gaming services are being provided to gaming machines via communication networks that link groups of gaming machines to a remote computer that provides one or more gaming services. As an example, gaming services that may be provided by a remote computer to a gaming machine via a communication network of some type include player tracking, accounting, cashless award ticketing, lottery, progressive games and bonus games.

Typically, network gaming services enhance the game playing capabilities of the gaming machine or provide some operational advantage in regards to maintaining the gaming machine. Thus, network gaming services provided to groups of gaming machines linked over a dedicated communication network of some type have become very popular in the gaming industry. In general, the dedicated communication network is not accessible to the public. To justify the costs associated with the infrastructure needed to provide network gaming services on a dedicated communication network, a certain critical number of gaming machines linked in a network of some type must utilize the service. Thus, many of the network gaming services are only provided at larger gaming establishments where a large number of gaming machines are deployed.

A progressive game network offering progressive game services is one example where a group of gaming machines are linked together using a dedicated network to provide a network gaming service. The progressive game services enabled by the progressive game network increase the game playing capabilities of a particular gaming machine by enabling a larger jackpot than would be possible if the gaming machine was operating in a "stand alone" mode. The potential size of the jackpot increases as the number gaming machines connected in the progressive network is increased. The size of the jackpot tends to increase game play on gaming machines offering a progressive jackpot which justifies the costs associated with installing and maintaining the dedicated progressive game network.

Within the gaming industry, a particular gaming entity may desire to provide network gaming services and track the performance of all the gaming machines under the control of the entity. The gaming machines under the control of a particular entity may be globally distributed in many different types of establishments. Casinos, convenience stores, supermarkets, bars and boats are a few examples of establishments where gaming machines may be placed.

FIG. 1 is a block diagram depicting gaming machines distributed in different establishments partially connected by a dedicated communication network for a typical gaming entity currently operating in the gaming industry. In FIG. 1, the gaming entity utilizes a central office 142. The gaming machines, 102, 104, 106, 114, 116, 136 and 138 for the gaming entity are located in two casinos, 110 and 122, and a store 140. A gaming entity may operate hundreds, thousands or ten of thousands of gaming machines. Since gaming is allowed in many locations throughout the world, the two casinos, 110 and 122, the central office 142 and the store may be distributed over a wide geographic area. For instance, the casino 110 may be located in Atlantic City, N.J., the casino 122 may be located in Australia, the central office may be located in Las Vegas, Nev. and the store may be located in Reno, Nev.

Within the casinos, the gaming machines may be connected to one or more database servers via one or more dedicated networks. The database servers are usually located in the backroom of the casino. For instance, in casino 110, gaming machines 102, 104 and 106 are connected to a database server 100 via a dedicated network 108. The dedicated network 108 may be used to send accounting information and player tracking information from the gaming machines to the database server 110. In casino 122, the gaming machines 114, 116, 118 may send accounting information and player tracking information to a database server using the dedicated network 120. Other dedicated networks (not shown) in casinos, 110 and 112, may provide such network gaming services as bonus game play, progressive game play and cashless ticketing.

In casinos 110 and 122, the database servers 100 and 112 may store and process accounting data from the gaming machines in communication with the database servers. For instance, an accounting report detailing the performance of individual and groups of gaming machines may be generated from the data stored on the database servers 100 and 112. In addition, accounting data or reports may be sent to the database server 124 in the central office 142 from each casino. These reports may contain game performance data collected from a number of gaming machines as well as hotel operations data. The data from the casinos may be sent to the central office using an expensive dedicated leased line 132 using a frame relay network.

The database server 124 may be used to generate reports summarizing the performance of all the gaming machines within the gaming entity (e.g. casino 110, casino 122 and store 140). The reports may be accessed locally using the local access points 126 and 128 via the local network. In addition, reports may be remotely accessed using a dial in number for a limited number of users. For instance, an executive travelling on the road might view gaming machine performance data from the remote access point 134 where the remote access point 134 may be a hotel room.

For the store 140, the gaming machines, 136 and 138 may be leased by the store operator. However, the cost of a dedicated communication network for a small number of gaming machines is usually not justified. Thus, the gaming machines operate in a "stand alone" mode. While operating in "stand alone" mode, network gaming services are not available to these gaming machines. To obtain performance data for the gaming machines, 136 and 138, a route operator may regularly extract performance data from the machines and manually transmit the information to the central office 142. A route may consist of a number gaming machines located in various locations such as bars, convenience stores and supermarkets. Usually, the route operator manually extracts performance data for all of the gaming machines located on their route. For a large route, this process may be both time consuming and costly.

Within the gaming industry, there is some desire to provide centralized network gaming services, centralized data access and centralized data acquisition to all of the gaming machines or a larger proportion of gaming machines within a gaming entity. For the casinos, 110 and 122, the gaming machines are connected via local dedicated networks that do not generally allow, for security reasons, the gaming machines to communicate with devices located outside of the casino. For instance, in FIG. 1, the database server 124 may not directly communicate with gaming machine 102 or gaming machine 114. Further, as described above, a dedicated network is usually not cost effective for smaller gaming establishments. Thus, with the communication infrastructure described in FIG. 1 which is representative of the communication infrastructure currently available in the gaming industry, the implementation of centralized network gaming services, such as centralized data acquisition may be difficult.

A current barrier to providing centralized network gaming services and centralized data acquisition for gaming machines diversely distributed throughout a gaming entity is the complexity and costs of the dedicated communication networks currently used in the gaming industry. The costs of installing and maintaining a dedicated communication network typically limit the application of dedicated networks to large establishments with a large number of gaming machines. Further, even in the larger establishments, the dedicated network are usually only implemented locally and centralized network gaming services (e.g. from a central office) are usually not provided. In view of the above, it would be desirable to provide gaming communication methods for gaming machines that reduce the complexity of the gaming network environment, reduce the costs associated with adding new network gaming services and simplify the data acquisition process for gaming machines widely distributed within a gaming entity.

Another desire within the gaming industry is to electronically download gaming software from one or more remote locations to a gaming machine. The capability to electronically download gaming software is desirable because it may enable gaming machines to be quickly reconfigured to account for changes in popularity of various games played on the gaming machines and it may simplify software maintenance issues on the gaming machine such as gaming software updates. Currently, in a time consuming process, gaming software is manually loaded onto each gaming machine by a technician. The software is manually loaded because the gaming software is usually very highly regulated and in most gaming jurisdictions only approved gaming software may be installed on a gaming machine. Further, the gaming software is manually loaded for security reasons to prevent the source code from being obtained by individuals which might use the source code to try to find ways of cheating the gaming machine. In view of the above, it would be desirable to provide gaming software downloading methods for gaming machines that allow gaming software to be transferred electronically to the gaming machines from a remote location in a secure manner that satisfies regulatory requirements of the gaming jurisdiction where the gaming machine is located.

SUMMARY OF THE INVENTION

This invention addresses the needs indicated above by providing gaming machines that may securely communicate with devices over a public network such as the Internet. The invention provides a combination of symmetric and asymmetric encryption that allows a single gaining machine to securely communicate with a remote server using a public network. The secure communication methods may be used to transfer gaming software and gaming information between two gaming devices such as between a gaming machine and a game server. For regulatory and tracking purposes, the transfer of gaming software between the two gaming devices may be authorized and monitored by a software authorization agent.

One aspect of the present invention describes a software authorization agent capable of generating a gaming software transaction record used to facilitate a transfer of gaming software between two gaming devices. The method may be generally characterized as comprising: 1) receiving a gaming software transaction request from a first gaming device; 2) authenticating an identity of the first gaming device 3) generating a gaming software transaction record comprising gaming software transaction information that is used to approve or reject the transfer of gaming software from a second gaming device to the first gaming device where the gaming software is for at least one of a) a game of chance played on a gaming machine, b) a bonus game of chance played on a gaming machine, c) a device driver for a for a device installed on a gaming machine and d) a player tracking service on a gaming machine.

In particular embodiments, the gaming software may comprise one or more gaming software components. The gaming software may be used to upgrade a gaming software component on the gaming machine or may be used to correct an error in a gaming software component on the gaming machine. The game of chance may be a video slot game, a mechanical slot game, a lottery game, a video poker game, a video black jack game, a video lottery game, and a video pachinko game. The gaming transaction information may be one or more of a transaction encryption key, a transaction number, a time stamp, a transaction expiration time, a destination identifier, a machine identification number, a gaming software identification number, a gaming software provider identifier, a transaction number, a number of allowable downloads and combinations thereof.

The first gaming device may be at least one of a gaming machine, game server and combinations thereof. The transfer of gaming software may be performed at least one of manually and electronically. The software authorization agent may communicate with the first gaming device using an local area network, a wide area network, a private network, a virtual private network, the Internet and combinations thereof. Further, the software authorization agent and the first gaming device may communicate with another using at least one of a satellite communication connection, a RF communication connection and an infrared communication connection.

In other embodiments, the gaming software transaction request comprises access information and gaming software identification information. The access information may be one or more of operator identification information for the first gaming device, machine identification information for the first gaming device, operator identification information for the second gaming device and machine identification information for the second gaming device. The gaming software identification information may be one or more of a gaming software title, a gaming software provider identifier, a gaming software version number and a gaming software identification number.

In additional embodiments, the method may comprise one or more of the following: a) comparing access information in the gaming software transaction request with access information stored in a database and when the compared access information does not match the access information stored in the database, denying the gaming software transaction request b) comparing gaming software identification information in the gaming software transaction request with gaming software identification information stored in a database and when the gaming software identification information does not match the access information stored in the database, denying the gaming software transaction request, c) generating an identification sequence; encrypting the identification sequence with a public encryption key for the first gaming device wherein information encrypted with the public encryption key is decrypted with a private encryption key used by the first gaming device; sending the encrypted identification sequence to the first gaming device where the identification sequence may a symmetric encryption key used to encrypt gaming software transferred between the first gaming device and the second gaming device, d) receiving from the first gaming device a second identification sequence encrypted with a public encryption key used by the software authorization agent, decrypting the second identification sequence with a private encryption key corresponding to the public encryption key used by the software authorization agent; and comparing the second identification sequence to the identification sequence sent to the first gaming device to authenticate the identity of the first gaming device where the second identification sequence is a symmetric encryption key used to transfer gaming software between the first gaming device and the second gaming device, e) when the second identification sequence received from the first gaming device does not match the identification sequence sent to the first gaming device; denying the gaming software transaction request.

In yet other embodiments, the method may further comprise one or more of the following: i) storing the gaming transaction record information to a transaction database, ii) sending gaming software transaction information to the first gaming device where the gaming software transaction information is one or more of a one or more of a transaction encryption key, a public encryption key used by the second gaming device, a transaction number, a time stamp, a transaction expiration time, a destination identifier, a destination machine identification number, a gaming software identification number, a gaming software provider identifier, a number of allowable downloads, a transaction number and combinations thereof, iii) sending a notification message to a gaming software provider identified in the gaming software request of a pending gaming software download request and iv) requesting a list of gaming software installed on a gaming device.

Another aspect of the present invention provides a method in a software authorization agent of regulating a transfer of gaming software between two gaming devices. The method may be generally characterized as comprising: 1) receiving a gaming software download request message with gaming software transaction information from a first gaming device; 2) validating the gaming software download request using the gaming software transaction information; 3) sending an authorization message to the first gaming device authorizing the first gaming device to transfer gaming software to a second gaming device; where the gaming software is for at least one of a) a game of chance played on a gaming machine, b) a bonus game of chance played on a gaming machine, c) a device driver for a for a device installed on a gaming machine and d) a player tracking service on a gaming machine. The game of chance may be a video slot game, a mechanical slot game, a lottery game, a video poker game, a video black jack game, a video lottery game, and a video pachinko game. The gaming transaction information is one or more of a transaction encryption key, a transaction number, a time stamp, a transaction expiration time, a destination identifier, a machine identification number for the first gaming device, a machine identification number for the second gaming device, a gaming software identification number, operator information for the first gaming device, operator information for the second gaming device, a transaction number and combinations thereof.

In particular embodiments, the second gaming device may be at least one of a game server and a gaming machine. Further, the first gaming device may be a game server in communication with one or more gaming machines and the second gaming device may be a gaming machine. Also, the first gaming device may be a game server maintained by a gaming software provider and the second gaming device may be a game server in communication with one or more gaming machines. In addition, the first gaming device may be a game server maintained by a gaming software provider and the second gaming device may be a gaming machine. The software authorization agent, the first gaming device and the second gaming device communicate with one another a local area network, a wide area network, a private network, a virtual private network, the Internet and combinations thereof. The software authorization agent, the first gaming device and the second gaming device communicate with another using at least one of a satellite communication connection, a RF communication connection and an infrared communication connection.

The method may also comprise one or more of the following: a) comparing the gaming transaction information in the gaming software download request message with gaming transaction information stored in a transaction database to validate the gaming software download, b) sending a message to the first gaming device denying authorization for the first gaming device to transfer gaming software to the second gaming device, c) decrypting the download request message, d) receiving a first download acknowledgement message from the first gaming device and receiving a second download acknowledgement message from the second gaming device, e) comparing gaming software transaction information in the first download acknowledgement message with gaming software transaction information in the second download acknowledgement message to validate that the gaming software has been correctly transferred where the gaming software transaction information in the first download acknowledgement message includes at least a first digital signature determined for the gaming software and the gaming software transaction information in the second download acknowledgement message includes at least a second digital signature determined for the gaming software, f) receiving the gaming software from the first gaming device; validating the gaming software; and sending the gaming software to the second gaming device, g) determining a digital signature for the gaming software; and comparing the digital signature with an approved digital signature for the gaming software stored in a database to validate the gaming software, h) storing gaming software transaction information indicating that a status of the download request where the status is at least one of authorized, pending, completed and void and i) requesting a list of gaming software installed on a gaming device.

Another aspect of the present invention provides a method in a software authorization agent of distributing gaming software transaction information. The method may be generally characterized as comprising: 1) receiving a gaming software transaction information request from a gaming device; 2) authenticating an identity of the gaming device; 3) querying a gaming software transaction database for a set of gaming software transaction information requested by the gaming device where the gaming software transaction database comprises a plurality of records of gaming software transactions; and 4) sending the requested gaming software transaction information to the gaming device where the gaming software is for at least one of a) a game of chance played on a gaming machine, b) a bonus game of chance played on a gaming machine, c) a device driver for a for a device installed on a gaming machine and d) a player tracking service on a gaming machine.

In particular embodiments, each gaming software transaction record may includes gaming software transaction information that describes a transfer of gaming software from a first gaming device to a second gaming device. For instance, the gaming transaction information may be one or more of a transaction number, a time stamp, a transaction expiration time, a destination identifier, a machine identification number for the first gaming device, a machine identification number for the second gaming device, a gaming software identification number, operator information for the first gaming device, operator information for the second gaming device, a transaction number and a transaction completion time. The gaming software transaction database may also include a record of gaming software installed on one or more gaming devices.

The method may also comprise one or more of: a) generating a gaming transaction report that presents the set of gaming software transaction requested by the gaming device, b) generating a distribution of gaming software on a plurality of gaming machines at a specified time using the gaming software transaction information stored in the gaming software transaction database, c) generating a distribution of gaming software on a plurality of gaming machines for a plurality of times using the gaming software transaction information stored in the gaming software transaction database, d) generating a billing report and requesting a list of gaming software installed on the gaming device and e) storing the list of gaming software installed on the gaming device to the gaming software transaction database.

Another aspect of the present invention provides a method in a first gaming device of requesting a transfer of gaming software from a second gaming device. The method may be generally characterized as comprising: 1) generating a gaming software transaction request; 2) sending the gaming software transaction request to a gaming software authorization agent that approves or rejects the transfer of gaming software from the second gaming device; and 3) receiving gaming transaction information from the gaming software authorization agent that is used to transfer the gaming software from the second gaming device where the gaming software is for at least one of a) a game of chance played on a gaming machine, b) a bonus game of chance played on a gaming machine, c) a device driver for a for a device installed on a gaming machine and d) a player tracking service on a gaming machine.

In particular embodiments, the first gaming device may be a gaming machine and the second gaming device may be a game server. Also, the first gaming device may be a game server in communication with a plurality of gaming machines and the second gaming device may be a game server maintained by a gaming software content provider. The software authorization agent, the first gaming device and the second gaming device may communicate with one another a local area network, a wide area network, a private network, a virtual private network, the Internet and combinations thereof. Further, the software authorization agent, the first gaming device and the second gaming device may communicate with another using at least one of a satellite communication connection, a RF communication connection and an infrared communication connection.

In other embodiments, the transfer of gaming software may be performed at least one of manually and electronically. The gaming software may comprise one or more gaming software components. The gaming software may be used to upgrade a gaming software component on the gaming machine or may be used to correct an error in a gaming software component on the gaming machine.

The gaming software transaction information in the method may be one or more of a one or more of a transaction encryption key, a public encryption key used by the second gaming device, a transaction number, a time stamp, a transaction expiration time, a destination identifier, a destination machine identification number, a gaming software identification number, a gaming software provider identifier, a number of allowable downloads, a transaction number and combinations thereof. The gaming software transaction request may comprise access information and gaming software identification information. The access information may be one or more of operator identification information for the first gaming device, machine identification information for the first gaming device, operator identification information for the second gaming device and machine identification information for the second gaming device. The gaming software identification information may be one or more of a gaming software title, a gaming software provider identifier, a gaming software version number and a gaming software identification number.

The method may also comprise one or more of the following: a) sending authentication information used to identify the first gaming device to the gaming software authorization agent, b) sending a message requesting the gaming software to the second gaming device, c) receiving the gaming software from the second gaming device, d) determining a digital signature for the gaming software and sending a message with at least the digital signature to the gaming software authorization agent and e) authenticating an identity of the second gaming device.

Another aspect of the present invention provides a method in a first gaming device of transferring gaming software to a second gaming device. The method may be characterized as comprising: 1) receiving a gaming software transaction request; 2) sending the gaming software transaction request to a gaming software authorization agent that approves or rejects the transfer of gaming software; and 3) transferring the gaming software to the second gaming device; where the gaming software is for at least one of a) a game of chance played on a gaming machine, b) a bonus game of chance played on a gaming machine, c) a device driver for a for a device installed on a gaming machine and d) a player tracking service on a gaming machine.

In particular embodiments, the method may also comprise one or more of the following: i) receiving an approval of the gaming software transaction request from the gaming software authorization agent, ii) prior to transferring the gaming software, receiving a denial of the gaming software transaction request from the gaming software authorization agent; and terminating the transfer of the gaming software and iii) determining a digital signature for the gaming software and sending a message with at least the digital signature to the gaming software authorization agent.

In other embodiments, the first gaming device may be a gaming server and the second gaming device may be a gaming machine. Also, the first gaming device may be a gaming machine and the second gaming device may be a gaming machine. In addition, the first gaming device may be a game server maintained by a gaming software content provider and the second gaming device may be a game server maintained by a gaming entity. Further, the first gaming device may be a game server maintained by a gaming software content provider and the second gaming device may be a gaming machine maintained by a gaming entity. The software authorization agent, the first gaming device and the second gaming device may communicate with one another a local area network, a wide area network, a private network, a virtual private network, the Internet and combinations thereof. The software authorization agent, the first gaming device and the second gaming device may be communicate with another using at least one of a satellite communication connection, a RF communication connection and an infrared communication connection.

Another aspect of the present invention provides a software authorization agent for facilitating the transfer of gaming software between a plurality of gaming devices. The software authorization agent may be generally characterized as comprising: 1) a network interface allowing the authorization agent to communicate with each of the plurality of gaming devices; and 2) a processor configured or designed to (i) receive gaming software transfer requests via the network interface from a first gaming device for the transfer of gaming software from a second gaming device to a third gaming device (ii) approve or reject the gaming software transaction request wherein the gaming software is for at least one of a) a game of chance played on a gaming machine, b) a bonus game of chance played on a gaming machine, c) a device driver for a for a device installed on a gaming machine and d) a player tracking service on a gaming machine. The game of chance may be a video slot game, a mechanical slot game, a lottery game, a video poker game, a video black jack game, a video lottery game, and a video pachinko game.

In particular embodiments, the software authorization agent may further comprise one or more of the following: a) a transaction database containing gaming software transaction information where the gaming software transaction information is one or more of a transaction number, a time stamp, a transaction expiration time, a destination identifier, a machine identification number for the first gaming device, a machine identification number for the second gaming device, a gaming software identification number, operator information for the first gaming device, operator information for the second gaming device, a transaction number and a transaction completion time, b) a memory containing software allowing the processor to analyze the gaming software transaction information stored in the transaction database and generate gaming software distribution reports based upon the gaming software transaction information, c) a memory containing software allowing the processor to analyze the gaming software transaction information stored in the transaction database and generate gaming software billing reports based upon the gaming software transaction information, d) a database storing public encryption keys for one or more of the plurality of gaming devices, e) a database storing identification information for one or more of the plurality of gaming devices and f) a database storing identification information for the gaming software that is transferred from the second gaming device to the third gaming device where the identification information for the gaming software is a digital signature, a title, a manufacturer, an identification number and combinations thereof.

In other embodiments, the first gaming device may be a hand-held computing device, the second gaming device may be a portable memory device storing the gaming software and the third gaming device may be a gaming machine. Also, the first gaming device may be a first gaming machine, the second gaming device may be a second gaming machine and the third gaming device may be the first gaming machine. In addition, the first gaming device may be a first game server, the second gaming device may be a second game server and the third gaming device may be a first gaming machine. Further, the first gaming device may be a first game server, the second gaming device may be a second game server and the third gaming device may be the first game server.

Another aspect of the present invention may provide a first gaming device. The first gaming device may be generally characterized as comprising: 1) a network interface allowing communications between the first gaming device, a software authorization agent and one or more other gaming devices; and 2) a processor configured or designed to (i) send a request for the transfer of gaming software from a second gaming device to a third gaming device via the network interface to the software authorization agent (ii) receive from the software authorization agent a reply approving or rejecting the request for the transfer of the gaming software where the gaming software is for at least one of a) a game of chance played on a gaming machine, b) a bonus game of chance played on a gaming machine, c) a device driver for a for a device installed on a gaming machine and d) a player tracking service on a gaming machine. The gaming software may comprise one or more gaming software components. The gaming software may be used to upgrade a gaming software component on one of the gaming devices and may be used to correct an error in a gaming software component on one of the gaming devices.

In particular embodiments, the first gaming device may further comprise one or more of the following: 1) a memory device that stores gaming software, 2) a master gaming controller that controls a game of chance played on the first gaming device where the game of chance is a video slot game, a mechanical slot game, a lottery game, a video poker game, a video black jack game, a video lottery game, and a video pachinko game and 3) a memory device that stores public encryption keys for one or more of the plurality of gaming devices and the software authorization agent. The network interface may be connected to at least one of a local area network, a wide area network, a private network, a virtual private network, the Internet and combinations thereof and the network interface may provide at least one of a satellite communication connection, a RF communication connection and an infrared communication connection.

In other embodiments, the first gaming device may be a portable gaming device. The first gaming device may be a first gaming machine, the second gaming device may be a second gaming machine and the third gaming device may be the first gaming machine. Alternatively, the first gaming device may be a first game server, the second gaming device may be a second game server and the third gaming device may be a first gaming machine. Further, the first gaming device may be a first game server, the second gaming device may be a second game server and the third gaming device may be the first game server.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Figure 2:
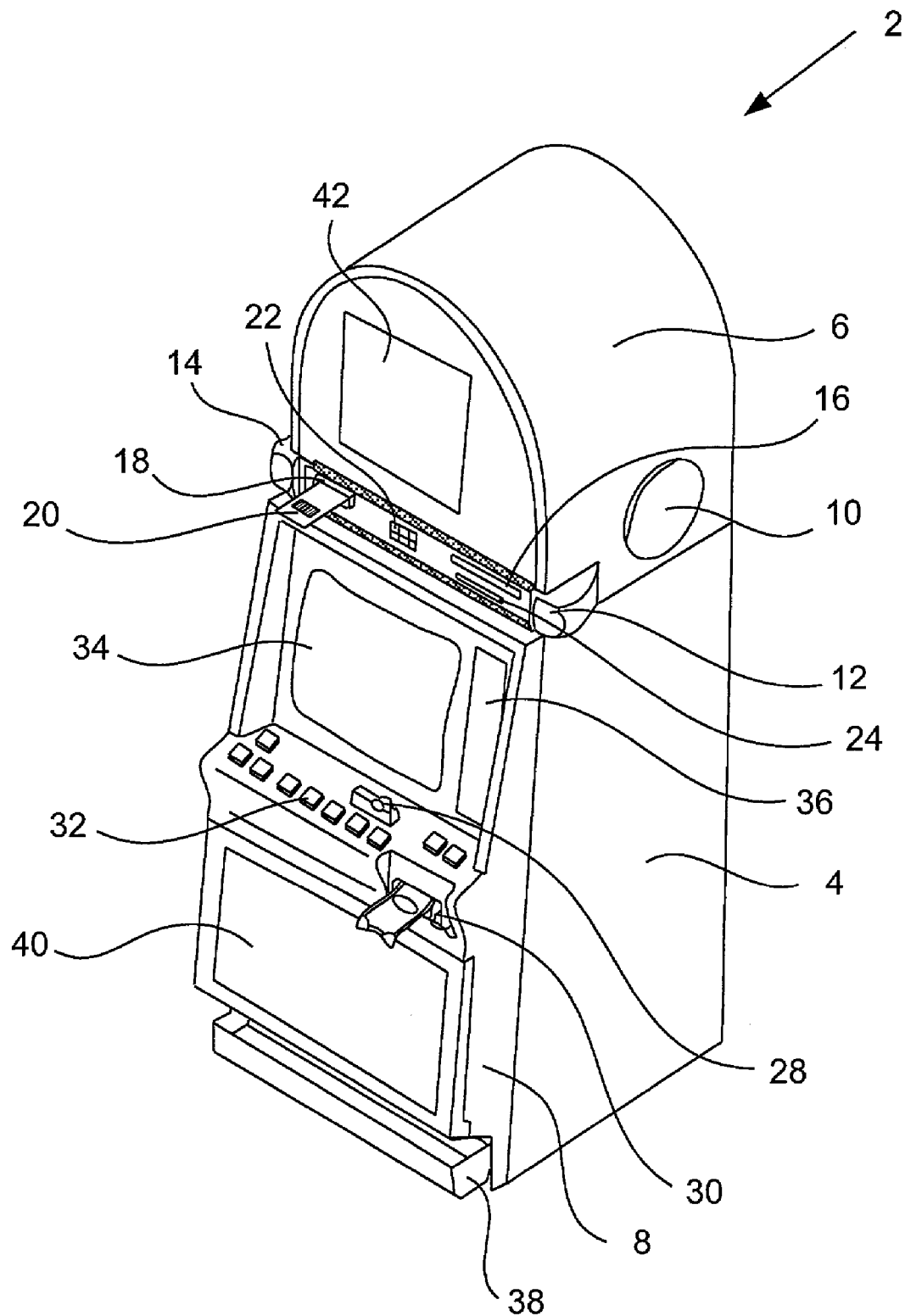
FIG. 2 is a perspective drawing of a gaming machine having a top box and other devices.

Turning first to FIG. 2, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2. Many possible games, including mechanical slot games, video slot games, video poker, video black jack, video pachinko and lottery, may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIGS. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Those of skill in the art will understand that the present invention, as described below, can be deployed on most any gaming machine now available or hereafter developed.

Figure 1:
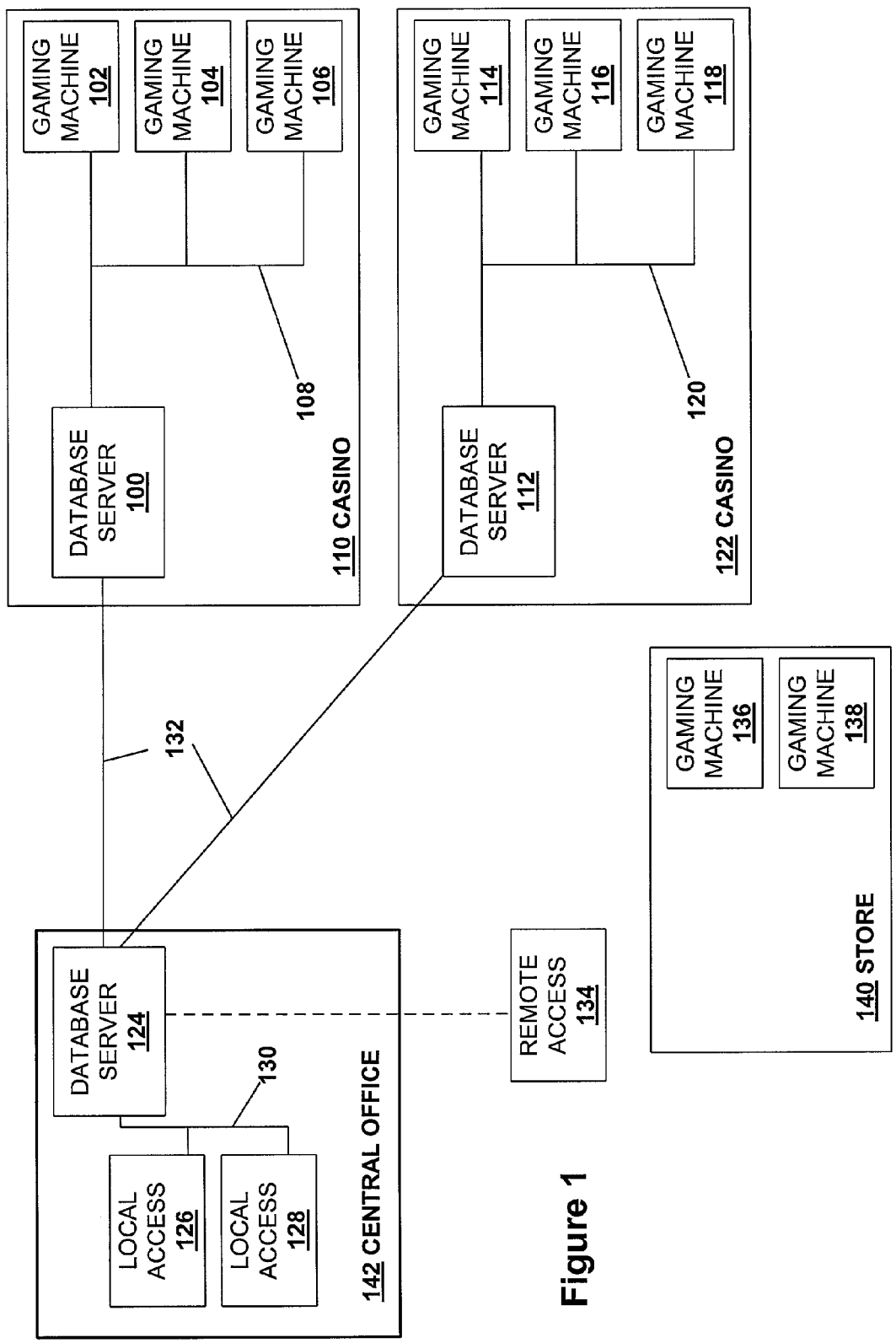
FIG. 1 is a block diagram depicting gaming machines distributed in different establishments partially connected by a dedicated communication network for a typical gaming entity currently operating in the gaming industry.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 3:
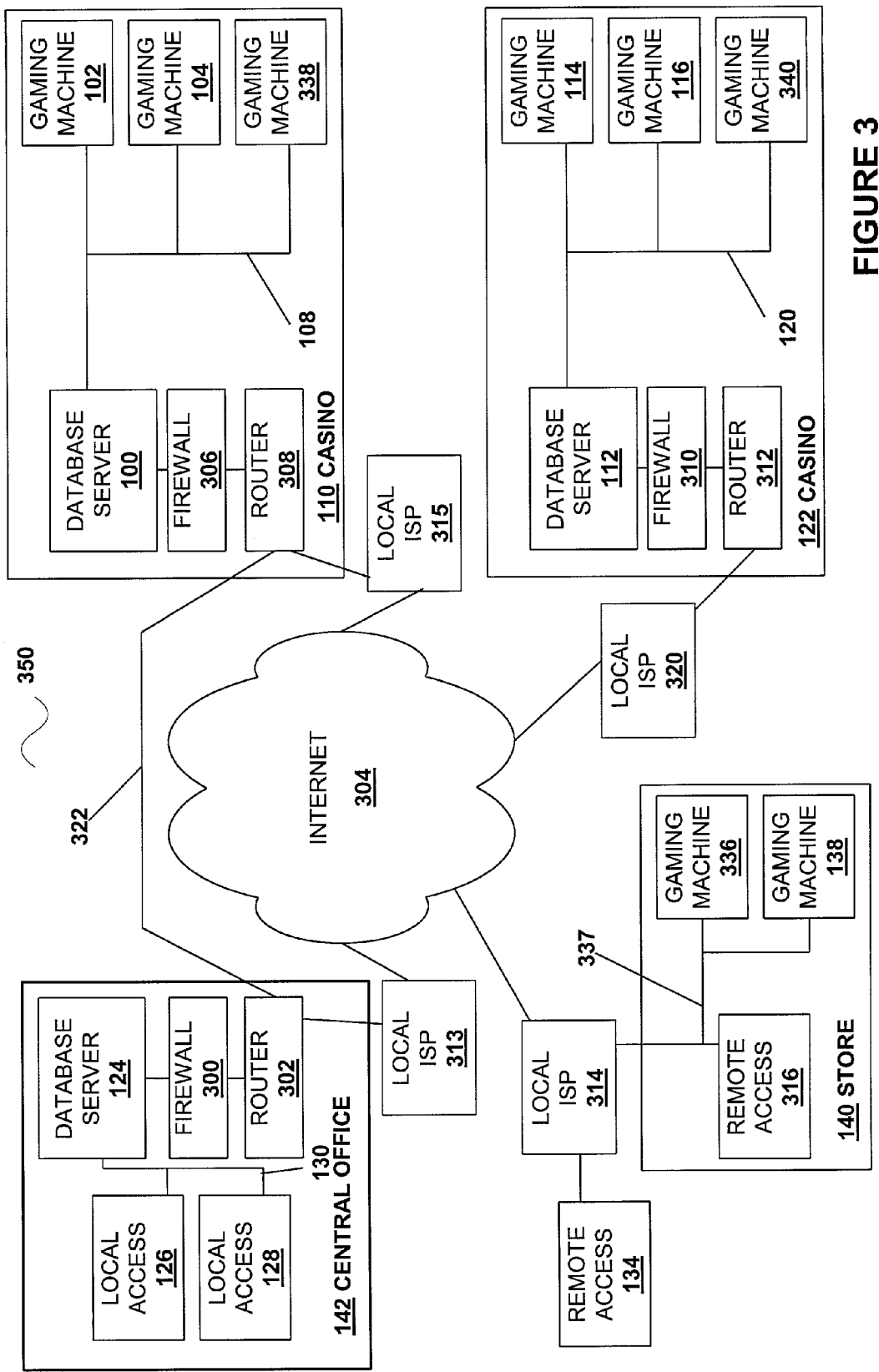
FIG. 3 is a block diagram depicting gaming machines distributed in different establishments connected using a secure virtual network.

FIG. 3 is a block diagram depicting gaming machines distributed in different establishments connected using a secure virtual network. Using the secure virtual network, network gaming services, data acquisition and data access may be provided to a large number of gaming machines distributed throughout a gaming entity 350 from a central location such as the central office 142. These services may be provided to gaming machines that have traditionally operated in a "stand alone" mode such as gaming machine 336 and 138 in the store 140. In FIG. 3, some of the communication infrastructure necessary to implement a secure virtual network for one embodiment of the present invention are described.

In one embodiment, the secured virtual network may be an IP based Virtual Private Networks (VPNs). An Internet-based virtual private network (VPN) uses the open, distributed infrastructure of the Internet to transmit data between corporate sites. A VPN may emulate a private IP network over public or shared infrastructures. A VPN that supports only IP traffic is called an IP-VPN. Virtual Private Networks provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols including RFC reports may be found from the VPN Consortium an industry trade group (http://www.vpnc.com, VPNC, Santa Cruz, Calif.).

In FIG. 3, a number of embodiments of IP VPN services are implemented to allow connectivity between the various gaming machines and database servers in the gaming entity. For instance, the gaming machine 336 in the store 140 may directly communicate with the database server 124 in the central office 142 via the internet 304. The communication path between the gaming machine 336 and the database server 124 may be the local ISP 314, a number of routers on the Internet 304, a local ISP 313 accessed by the central office 142, the router 302 and the firewall 300. The firewall may be hardware, software or combinations of both that prevent illegal access of the gaming machine by an outside entity connected to the gaming machine. For instance, an illegal access may be an attempt to plant a program in the database server that alters the operation of the database server or allows someone to steal data. The internal firewall is designed to prevent someone such as a hacker from gaining illegal access to the gaming machine and tampering with it in some manner. Firewalls and routers used in FIG. 3 may be provided by CISCO Systems (San Jose, Calif.).

The network interface between the gaming machine 336 and the local ISP may be a wireline interface, such as a wired Ethernet connection, a wired ATM connection, or a wired frame relay connection, or a wireless interface, such as a wireless cellular interface. For instance, the gaming machine 336 may include a wireless modem and an antenna that allows the gaming machine to connect with the local ISP 314. As another example, the gaming machine may contain a dial-in modem, a DSL modem or a cable modem that allows that gaming machine 336 to connect with the local ISP 314 via a coaxial cable or phone line 337. The gaming machine 336 may also contain an internal firewall to prevent illegal access to the gaming machine. Other gaming machines, such as 338 and 340, located at various locations throughout the gaming entity 350 may also include the hardware described above and transmit information via a local ISP, such as 315 and 320, and the Internet 304, to a remote server such as the database server 124 in the central office 142.

Using the network interface, the gaming machine 336 may send game performance data, game usage information and gaming machine status information or any other information of interest generated on the gaming machine from one or more gaming transactions to the database server 124 located in the central office or some other remote server. Using this method, the need to manually gather data from the gaming machine using a route operator may be eliminated, which may reduce gaming machine operating costs and may provide better tracking of the performance of gaming machines, such as 336, that have traditionally operated in a "stand alone" mode.

For security purposes, any information transmitted from the gaming machine 336 over a public network to a remote server may be encrypted. The encryption may be performed by the master gaming controller or by another logic device located on the gaming machine. In one embodiment, the information from the gaming machine may be symmetrically encrypted using a symmetric encryption key where the symmetric encryption key is asymmetrically encrypted using a private key. The public key may be obtained by the gaming machine 336 from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. In addition, a different symmetric encryption key is used for each transaction where the key is randomly generated. Symmetric encryption and decryption is applied to most of the information because symmetric encryption algorithms tend to be 100–10,000 faster than asymmetric encryption algorithms.

Information needed to apply the encryption algorithm such as private keys and public keys may be stored on a memory residing in the gaming machine 336 where the memory may be a flash memory, an EPROM, a non-volatile memory, a ROM, a RAM, a CD, a DVD, a tape drive, a hard drive or other memory storage device. Typically, the public keys are stored on a writeable media such as a hard drive while the private keys are stored on a read only memory such as an EPROM or a CD-ROM. The same or a different memory residing on the gaming machine 336 may also include information used to authenticate communications between the gaming machine 336 and a remote server, such as 124. For instance, a serial number or some other identification numbers may be used by the firewall 300 or the database server 124 to authenticate the sender of a message.

The encrypted communications from the gaming machine 336 to a remote server may be implemented using a TCP/IP communication protocol. Thus, the encrypted information from the gaming machine may be encapsulated in multiple information packets and sent to the IP address and/or an unique ID (UID) of a remote server. The gaming machine 336 may contain a memory storing a number of IP addresses and/or unique IDs (UIDs) of remote servers or other devices where the gaming machine may send information. Prior to sending a message, the gaming machine may look up the IP address and/or the UID of the remote server or destination device.

For each information packet, the gaming machine may generate one or more signatures and may append them to the information packet. The signature may allow the recipient of the packet to unambiguously identify the sender of the packet as well as to determine if the correct amount of data was received. For instance, the signature may include a checksum of the data that was sent. Further, the information packet may contain routing information allowing subsequent communication with the gaming machine, such as an IP address and/or an UID of the gaming machine. General details of these types of processes, such as TCP/IP implementation and data authentication, are described in the text "Mobile IP Unplugged" by J. Solomon, Prentice Hall and the text "Computer Networks", A. S. Tanenbaum, Prentice Hall. Both of these references are incorporated herein by reference in their entireties and for all purposes.

Using the communication infrastructure and methods described above a gaming machine or other device connected to a remote server may request one or more gaming services from a remote server. For instance, a gaming machine may send a game license request to the remote server 124. A gaming machine may store code to play one or more games controlled by the master gaming controller such as a video slot game, a mechanical slot game, a lottery game, a video poker game, a video black jack game, a video lottery game, and a video pachinko game. Traditionally, installing a new game has involved manually exchanging (e.g., by hand) an EPROM (e.g. a read-only memory) containing the game on the gaming machine. Using the communication infrastructure described above, the gaming machine 336 may request a game license for one or more games stored in the gaming machine from a remote server acting as a game license server such as 124. The game license server may send a game license reply message containing a game license which allows the gaming machine to present the one or more games stored on the gaming machine. These game license requests may be performed prior to each game or the license may allow game play for some finite time period. For instance, the game license may be an annual license, a monthly license, a daily license, a per-use license or a site license. Details of the game license request and reply process between a gaming machine and a remote server are described with reference to FIGS. 6 and 7.

In another example, the gaming machine 336 may send a maintenance request message to a remote server when the gaming machine malfunctions. After receiving the maintenance request message, the remote server may perform one or more remote diagnostics on the gaming machine 336 via one or more diagnostic request messages. The remote diagnostics may include both software and hardware diagnostics. In addition, the remote server may develop service priority list based upon a plurality of maintenance requests received from a group of gaming machines in communication with the remote server. In yet another example, a remote server may obtain software version information or gaming configuration information, from gaming machine 336, by sending a software version request message or a gaming configuration request message to the machine. Information contained in these messages may be used to provide software updates and gaming configuration updates to the gaming machine 336.

In a further example, the gaming machine 336 may generate a digital signature or some other type of unique identification information and may send a digital signature verification request or an identification verification request to a remote server. The verification request may be part of an electronic fund transfer. After receiving authorization from the remote server in an authorization reply, the gaming machine 336 may send a fund transfer request with fund transfer information to the remote server and may receive a fund transfer reply authorizing the gaming transaction.

A remote server may also provide performance reports or other services for the gaming machine 336. For instance, the gaming machine 336 may send a report request message to the remote server 124 requesting a performance report for the gaming machine over some prior time period. After remote server generates the report, it may be sent back to the gaming machine 336 or some other access point for display. For instance, the report may be displayed on a display screen of the gaming machine 336, a computer 316 located in the store 140 or on a portable network access point 134 located outside of the store.

An advantage of the virtual network described above is that it allows gaming services such as data acquisition, game licensing and report generation to be provided a single gaming machine without the use of a dedicated network which are typically expensive. This advantage may potentially increase the utility of a gaming machine while reducing the costs associated with operating and maintaining a machine. In particular, for gaming establishments with a small number of gaming machines operating in a "stand alone" mode, a virtual network may be the only viable way to provide cost effective gaming services via a network. The virtual network is enabled by an encryption scheme which utilizes multiple key encryption and symmetric encryption keys to provide secure communication of sensitive gaming data. For each session, the symmetric encryption keys may be randomly generated or may be rotated by selecting from a pool of keys.

The methods described above may be applied and may be advantageous to any gaming machine in the gaming entity 350. Also, many different embodiments of the methods are possible. For instance, using a wireless network interface, gaming machine 338 in Casino 110 may send game license requests or other requests to the database server via the router 308, the dedicated line 322, router 302 and the firewall 300. As another example, using a wireline network interface, such as a wired Ethernet connection, a wired ATM connection or a wired frame relay connection, gaming machine 340 in casino 122 may send may send a gaming report request to the database server 100 in casino 110 via the database server 112, the firewall 310, the router 312, the local ISP 320, the internet 304, the local ISP 315, the router 308 and the firewall 306. When a dedicated communication network is used, encryption may be optional over the dedicated network, e.g. if a dedicated network was used between the gaming machine 340 and the database server 112, the gaming machine 340 may not use encryption to send information to the database server 112. However, the database server would apply an encryption scheme such as the one described above before sending out information over a public network. Returning to the example, the database server 100 may serve as a regional report server. After generating a gaming report reply message to the gaming report request message from gaming machine 340, the database server 100 may send a message to the database server 124 in the central office 142 acknowledging that a report was generated.

The virtual network may also allow remote access to gaming information such as gaming performance information at various gaming establishments in the gaming entity from mobile access points. For example, the remote access point 134 may be a portable computer with a wireless modem. Typically, the remote access point 134 will have a high level of security such as special access software. Using the remote access point 134, a user such as a travelling employee of the game entity may access gaming information at casino 110 or casino 122 via the local ISP 314. The access may be routed through the central office 142 or may be routed directly to one of the casinos bypassing the central office. In addition, different access privileges may be accorded to different remote users. For instance, one remote user may be able to access information from any establishment in the gaming entity while another may only be able to access information from a particular establishment.

Figure 4:
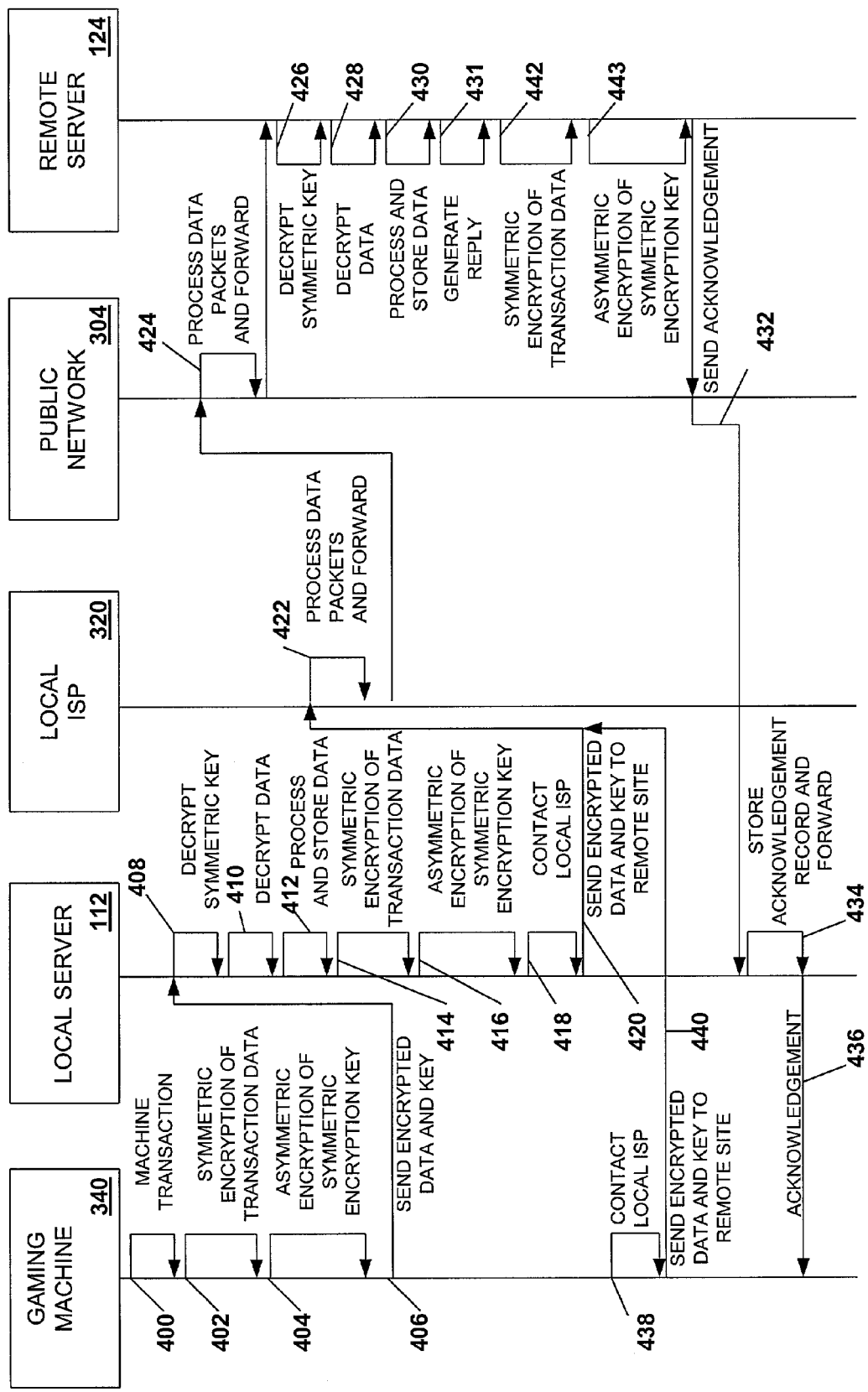
FIG. 4 is an interaction diagram showing communications between a gaming machine, local server, local ISP and remote server over a public network.

FIG. 4 is an interaction diagram showing communications between a gaming machine, local server, local ISP and remote server over a public network. The diagram provides some details of a communication process between a gaming machine 340 in casino 122 and the database server 122 in the central office 142 as described with reference to FIG. 3 for one embodiment of the present invention. In 400, the gaming machine 340 may perform a gaming transaction such as a coin-in, initiating a game play or a coin-out. In 402, the gaming machine 340 symmetrically encrypts gaming transaction data from one or more gaming transactions using a symmetric encryption key. In 404, the symmetric encryption key may be encrypted using an asymmetric encryption key such as public key in a public-private encryption scheme which may only be decrypted using a matching private key at the message destination. For each gaming transaction, a symmetric encryption key is selected from a pool of symmetric encryption keys or randomly generated. Thus, the symmetric encryption key varies from gaming transaction to gaming transaction. When a dedicated or private communication network is used and extra security is desired, the symmetric key may also be asymmetrically encrypted with an asymmetric encryption key which is non-public. In 406, a message may be generated and the encrypted data and key may be sent to a local server 112.

As previously described with reference to FIG. 3, the encrypted information may be encapsulated in multiple information packets using a TCP/IP communication protocol. In addition other communication protocols such as a frame relay communication protocol, an ATM communication protocol or combination of protocols may also be utilized. Prior to sending the data, the gaming machine may look up the IP address and/or the UID of the remote server which may be stored in a memory on the gaming machine. When a dedicated communication network is used between the gaming machine and the remote server, such as local server 112, the encryption process performed by the gaming machine may be optional. Prior to sending the message, the gaming machine 340 may generate one or more signatures that allow the receiver of the message to authenticate the sender of the message as well as the accuracy of the data contained in the message. These signatures may be appended to the message or incorporated in the message in some manner.

In one embodiment, the gaming machine 340 may bypass the local server and may send a message to the remote server 124 via the local ISP 320. In some embodiments, a local server may not be available to the gaming machine, such as gaming machine 336 in the store 140 in FIG. 3. In 438, when communications are not established between the local ISP 320 and the gaming machine 340, the gaming machine may contact the local ISP 320 using a network interface and establish communications with the local ISP 320. In 440, the gaming machine 340 may send a message with the encrypted gaming transaction data and the encrypted symmetric key to the IP address and/or the UID of the remote server 124 via the local ISP 320.

In 408, the local server 112 receives a message from the gaming machine 340. The local server 112 may authenticate that the message was sent from the gaming machine 340 and determine that the data sent in the message is complete. Next, the local server 112 may decrypt the symmetric encryption key using a private asymmetric encryption key stored on the local server. In 410, the local server decrypts the transaction information included in the message using the symmetric encryption key. In 412, the local server 112 may process and store the data generated from the gaming machine.

In 414, gaming transaction data from the gaming machine 340 may again be symmetrically encrypted using a symmetric encryption key. The gaming transaction data may also include additional gaming transaction data from other gaming machines. In one embodiment, the gaming transaction data may include game usage data that allows a game played on a gaming machine to be billed on a per use basis. In 416, the symmetric encryption key may be asymmetrically encrypted using an asymmetric encryption key such as a public key exchanged between the local server and the remote server 124 and a message containing the encrypted data may be generated. Prior to sending the message, the local server 112 may generate one or more signatures that allow the receiver of the message to authenticate the sender of the message as well as the accuracy of the data contained in the message. These signatures may be appended to the message or incorporated in the message in some manner. In 418, when a communication has not been established between the local server 112 and a local ISP 320, the local server may contact the local ISP 320 and establish communications using an appropriate communication protocol such as TCP/IP. In 420, the local server 112 may send a message with the encrypted gaming transaction data and the encrypted symmetric key to the IP address and/or the UID of the remote server 124 via the local ISP 320.

In 422, the local ISP 320 processes and forwards the message from the local server 112 or the gaming machine 340 to the public network 304. In 424, the public network processes the message from the local ISP 320 and forwards it to the remote server 124. Processing of the message by the local ISP 320 and the public network 304 may involve routing multiple data packets comprising the message.

In 426, the remote server receives a message from the gaming machine 340 or the local server 112. The remote server 124 may authenticate the sender of the message using one or more signatures included in the message and determine the accuracy of the data of the message. For instance, the remote server may generate a check sum, CRC, or other verification of the data in the message and compare that with a check sum, CRC, or other verification of the data generated by the sender of the message. Next, the asymmetrically encrypted symmetric encryption key may be decrypted using a private key residing on the remote server 124. In 428, the symmetric key may be used to decrypt the symmetrically encrypted data. In 428, the remote server may process and store the data. The message from the gaming machine or local server 112 may include a request of some type for the remote server. In 430, the remote server may implement the request. For instance, the message may contain a request for a game license (See FIGS. 6 and 7), a request for a report or a request for some other game service.

In 431, the remote server may generate a reply message. The reply message may include an acknowledgement that the original message was received and may also include requested information. For instance, the remote server may request diagnostic data or a report of some type from the gaming machine. The data in the reply message may be encrypted. Thus, in 442, the transaction reply data may be symmetrically encrypted using a symmetric encryption key and in 443 the symmetric encryption key may be asymmetrically encrypted using the recipient's public key. When the reply message is received by a gaming device, such as the gaming machine 340 or the local server 112, the gaming device may decrypt (e.g., as in 426) the asymmetrically encrypted symmetric encryption key using a private key stored on the gaming device.

In 432, the remote server sends the reply message to the local server 112 and/or the gaming machine 340 via the public network 304. The remote server 124 may access the public network via an ISP local to the remote server 124. In 434, the local server may receive a reply message and store data included in the message. In some embodiments, the acknowledgement may be forwarded to the gaming machine 340. In other embodiments, the local server 112 may be by-passed or a local server 112 may not be available to the gaming machine 340 and the reply message may be received directly by the gaming machine 340 via the local ISP 320.

Figure 5A:
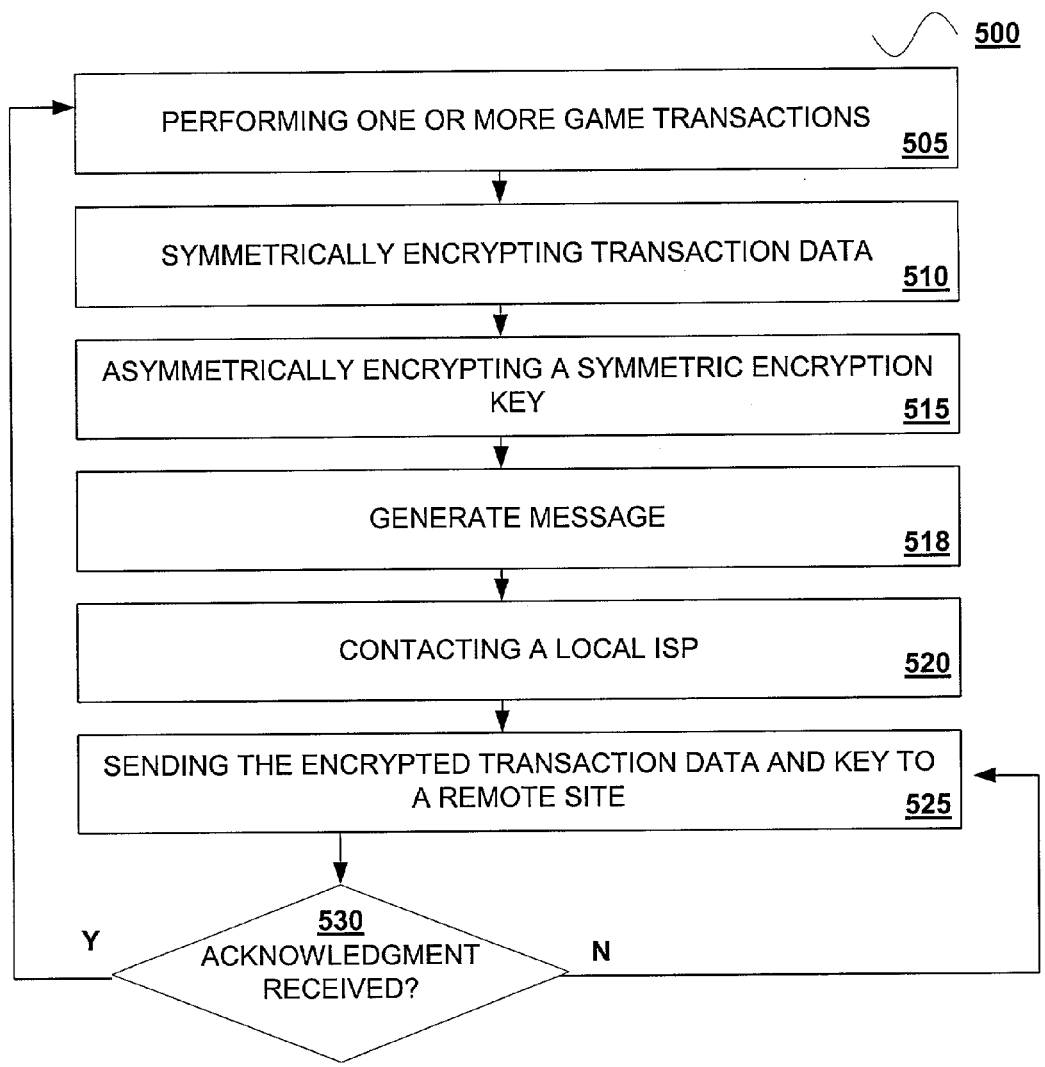
FIG. 5A is a flow chart depicting a method of sending transaction data between a gaming machine and one or more remote servers.

FIG. 5A is a flow chart depicting a method 500 of sending transaction data between a gaming machine and one or more remote servers. Although the method is described on a gaming machine for illustrative purposes, the method is not so limited and may be applied on other gaming devices such as the remote servers described above. Thus, as described with reference to FIG. 4, the gaming machines and remote servers may send messages with encrypted data to one another in a similar manner. In 505, the gaming machine performs one or more gaming transactions. For example, a gaming transaction may be a coin-in or a pay-out on the gaming machine. Information from one or more gaming transactions may be stored in a non-volatile memory located on the gaming machine. In 510, the gaming transaction data may be symmetrically encrypted using a symmetric encryption key. The encrypted gaming transaction data may include data generated from a single gaming transaction or multiple gaming transactions. The symmetric key may be selected from a pool of symmetric keys or may be randomly generated such that the symmetric key is varied each time gaming transaction data is encrypted. In 515, the symmetric encryption key may be asymmetrically encrypted using a public key that was previously exchanged between the gaming machine and the recipient of the message. In the case, where a dedicated network is used the asymmetric encryption key is non-public i.e. it is not readily available to the public.

In 518, the gaming machine generates a message containing the symmetrically encrypted gaming transaction data and the asymmetrically encrypted symmetric encryption key over a communication protocol such as but not limited to TCP/IP. The message may include additional information such as signatures to authenticate the sender of the message, signatures to validate the accuracy of the data included in the message and an IP address and/or an UID of the sender as well as other message routing information. The message may also include a request for the recipient to return information to the gaming machine. For instance, the gaming machine may request a remote server to provide a gaming license that allows a game to be played on the gaming machine.

In 520, when communications have not been established between the gaming machine and a local ISP, the gaming machine may contact a local ISP. The gaming machine may also send messages to a local ISP by sending the message first to a local server which may then forward the message to the local ISP. The gaming machine may contact the local ISP using a communication protocol such as TCP/IP and a network interface such as a wireless modem. In 525, the gaming machine sends the message generated in 518 to a remote site such a game license server, a report server or some other device via the local ISP. In 530, the gaming machine may determine when an acknowledgement message has been received from the remote site. When an acknowledgement message has not been received, the gaming machine may resend the message one or more times. When the acknowledgement message has been received, the gaming machine may repeat process 500.

Figure 5B:
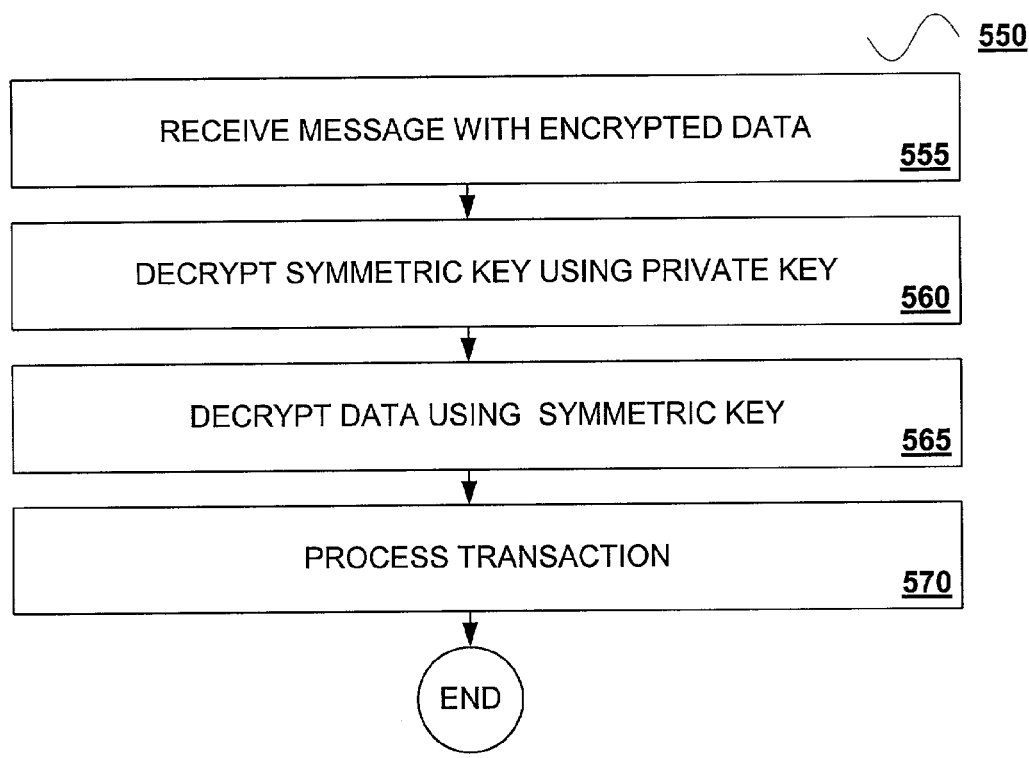
FIG. 5B is a flow chart depicting a method of receiving transaction data between a gaming machine and one or more remote servers.

FIG. 5B is a flow chart depicting a method 550 of receiving transaction data between a gaming machine and one or more remote. Although the method is described on a remote server for illustrative purposes, the method is not so limited and may be applied on other gaming devices such as the gaming machines described above. Thus, as described with reference to FIG. 4, the gaming machines and remote servers may receive and process messages with encrypted data from one another in a similar manner.

In 555, the remote server receives a message with encrypted gaming transaction data from a gaming machine, another remote server or some other gaming device. In 560, an asymmetrically encrypted symmetric encryption key included in the message in 555 is decrypted using a private key stored on the remote server. In 565, the decrypted symmetric encryption key may be used to decrypt symmetrically encrypted gaming transaction data included in the message. In 570, the decrypted gaming transaction data or any service requests contained in the message are processed. For instance, gaming transaction data in the message may be archived.

Figure 6:
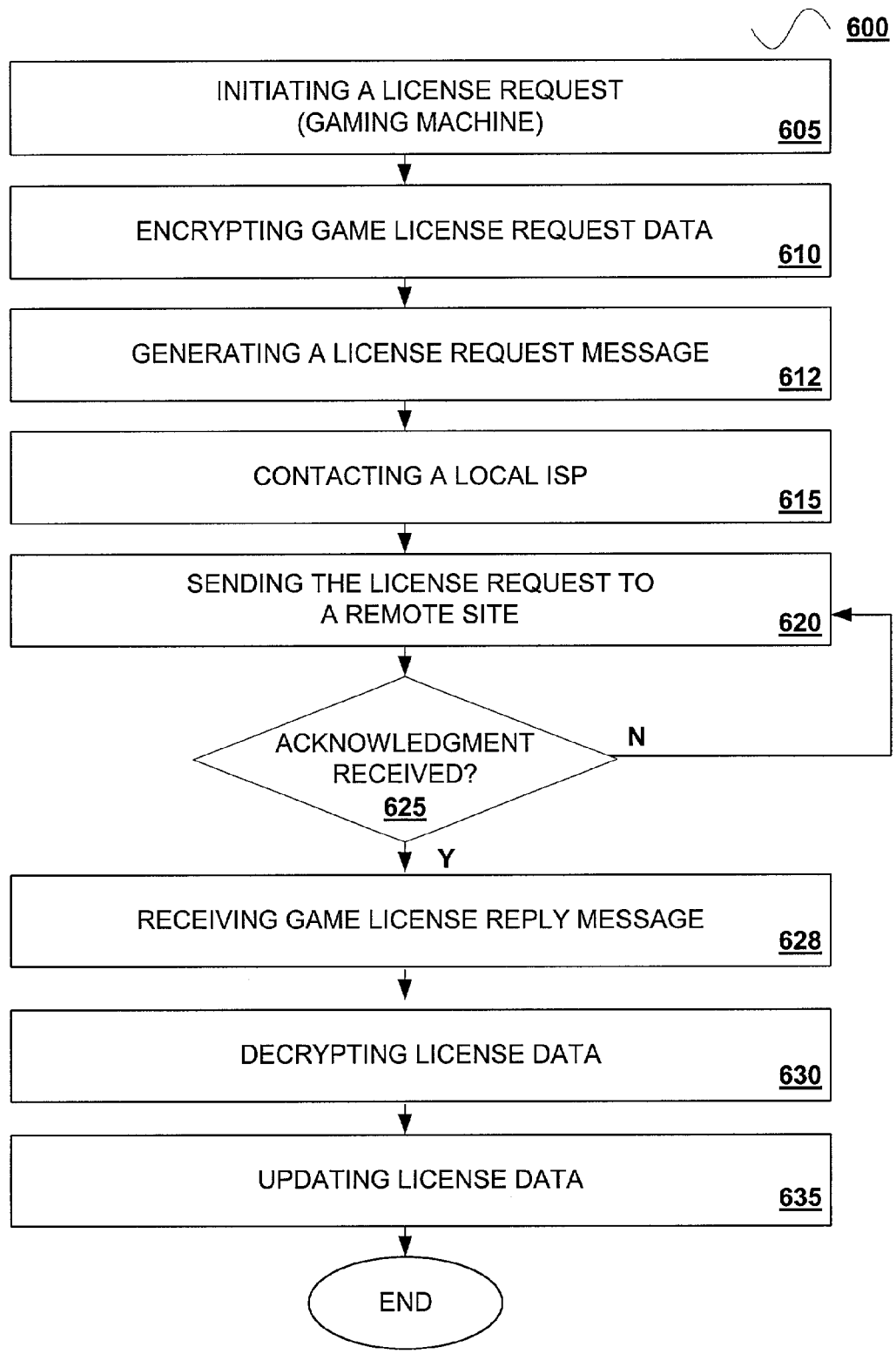
FIG. 6 is a flow chart depicting a method of obtaining a game license on a gaming machine.

FIG. 6 is a flow chart depicting a method 600 of obtaining a game license on a gaming machine providing game play of one or more games. In 605, a gaming machine initiates a gaming license request. In one embodiment, the gaming license request may be initiated when a current gaming license on the gaming machine is about to expire. In another embodiment, the gaming license request may be initiated in response to a player on a gaming machine requesting a game play of a particular game. In 610, game license request data used to provide and implement gaming licenses is encrypted. The game license data may be encrypted using a symmetric encryption key and the symmetric encryption key may be asymmetrically encrypted using a public key. The game license request data may include the symmetric encryption key, a serial number of the software corresponding to one or more games or some other software identification number, a serial number of the gaming machine as well as other machine identification information, game owner identification information, game usage data including the number of times a gaming license has been used and license expiration data. The game usage data may be used to bill the gaming entity owning the gaming license for use of the game license. The software identification number in the gaming license data may correspond to one or more games such as a video slot game, a mechanical slot game, a video poker game, video blackjack game and video pachinko game.

In 612, a game license request message is generated with the encrypted game license request data. The game license request message may be sent to a remote server using a TCP/IP protocol. Thus, the game license request message may include an IP address and/or an UID of the remote server as well as an IP address and/or an UID of the gaming machine. The gaming machine may store the IP addresses and/or the UIDS of one or more remote servers in a memory residing on the gaming machine. Prior to sending the gaming license request message, the gaming machine may look-up the IP address and/or the UID of the destination remote server. The gaming license request message may include one or more signatures used by the recipient of the message to unambiguously identify the sender of the message and to validate the accuracy of the data contained in the message. The signatures may be generated by the gaming machine and appended to the message.

In 615, when communications between the gaming machine and a local ISP have not been established, the gaming machine may contact a local ISP and establish communications. In one embodiment, the gaming machine may not directly contact a local ISP. Instead, the gaming machine may contact and may send the gaming license request message to a local server which contacts a local ISP and sends the gaming license request message. In another embodiment, the gaming machine may send unencrypted gaming license request data to the local server. The local server may encrypt the gaming license request data, generate a gaming license request message and send the message to a remote server such as a gaming license request server.

In 620, the gaming machine sends the gaming license request message to a remote site such as a game license server via the local ISP. When a communication protocol such as TCP/IP is used, the message may be encapsulated in multiple information packets. In 625, the gaming machine determines whether an acknowledgement from the remote site has been received. When the acknowledgement from the remote site has not been received, the gaming machine may resend the message according to 620.

In 628, the gaming machine receives a game license reply message. The game license reply message may include a number of signatures used by the gaming machine to authenticate the sender of the message and to validate the data contained in the message. In 630, the gaming machine may decrypt an asymmetrically encrypted symmetric encryption key using a private key stored in memory on the gaming machine and then decrypt the game license reply data with the symmetric encryption key. The game license reply data may include a game license for one or more games available on the gaming machine. The game license may be an identification number of some type that allows software on the gaming machine corresponding to the license to be executed. The game license reply data may also include an expiration date for the license. In 635, the gaming machine may update game license data stored on the gaming machine when a new game license was included in the game license reply data. In one embodiment, the game license request message may include game usage data without a request for a new license. In this case, the game license reply message may include an acknowledgement that the game license request message was received but may not contain a new game license.

An advantage of the game license request method is that a gaming machine owner may be able operate gaming machines including many different types of games but only pay for each game on a per use basis. In a "pay-as-you go" billing scheme, an operator of the gaming machine is charged each time a game is played on the gaming machine. At regular intervals, a usage fee may be paid by the operator of the gaming machine to the owner's of the gaming software used on the gaming machine. The cost per use of each game may be varied from game to game and these costs may change with time. For example, the cost per use charged for newer gaming titles may be higher than the cost per use charged for older gaming titles. Thus, when a particular game is unpopular, the costs to the gaming machine operator are minimized as compared to when the gaming machine operator pays up front for a gaming machine with a game that receives little game play.

Another advantage of the game license request method is that it may also be used for other types of game service requests. For instance, a report request message with encrypted report request data may be generated in the manner described above and sent to a remote server via a local ISP. When a report reply message is received via the local ISP containing a report, the report may be displayed to the gaming machine. In another example, a gaming machine may send a maintenance request message via a local ISP in a manner described above.

Figure 7:
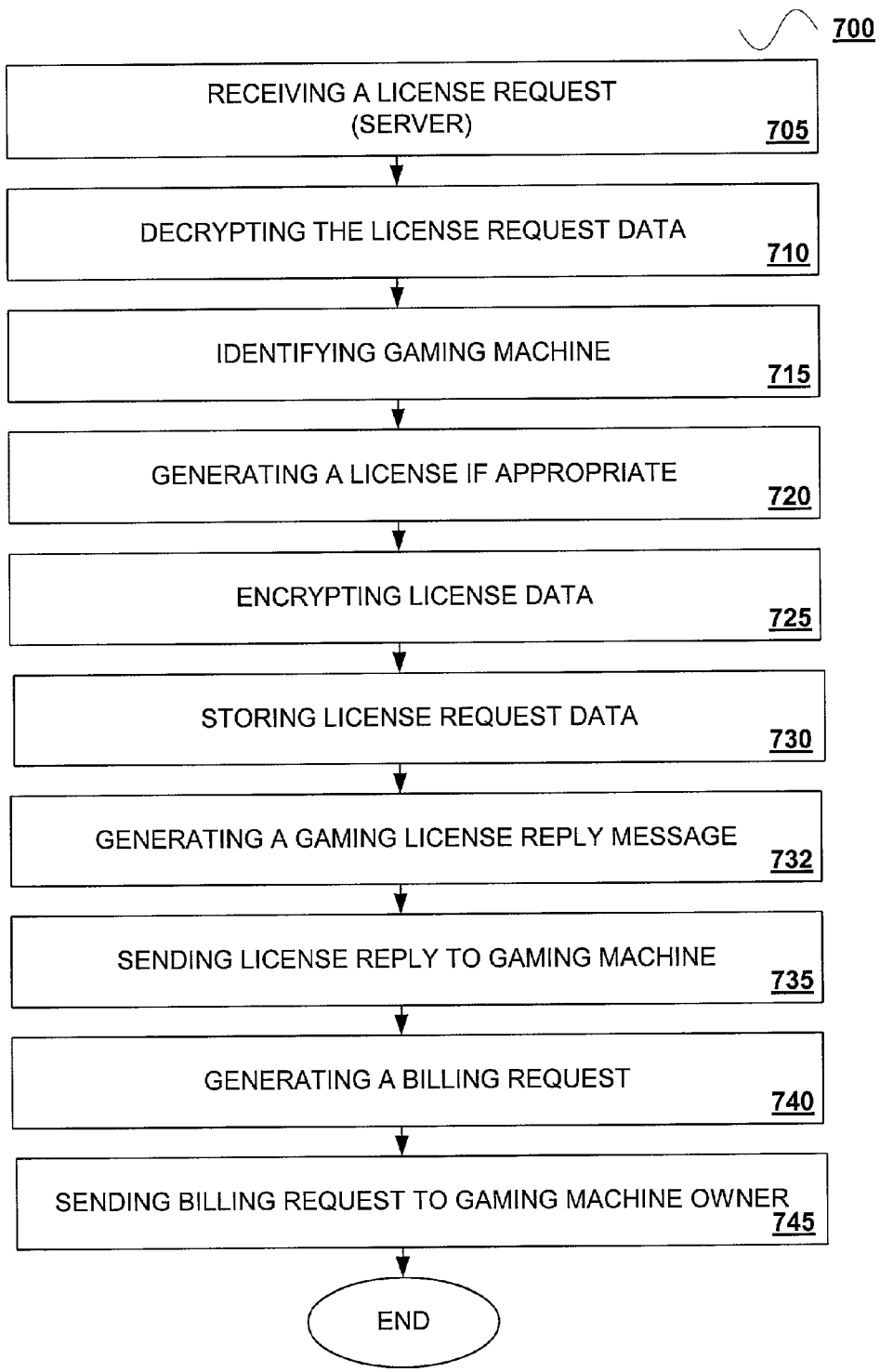
FIG. 7 is a flow chart depicting a method of providing a game license to one or more gaming machines using a remote server.

FIG. 7 is a flow chart depicting a method 700 of providing a game license to one or more gaming machines using a remote server. In 705, the remote server receives a game license request message from a gaming machine, local server or some other device. The message may have been received via a local ISP in communication with the remote server. As described above, although not shown in the flow chart, the remote server may also receive a report request, maintenance request or some other transaction request from the gaming machine, local server or remote device. After receiving the message, the remote server may authenticate the sender of the message using one or more signatures contained in the message and validate the accuracy of the data in the message using one or more signatures contained in the message. For instance, the remote server may generate a checksum on the data in the message and compare it with a checksum generated by the gaming machine on the data in the message which was appended to the message.

In 710, the remote server may decrypt a symmetric encryption key included in the game license request message using a private encryption key. With the symmetric encryption key, the remote server may decrypt the game license request data. The game license request data may include a serial number of the software corresponding to one or more games or some other software identification number, a serial number of the gaming machine as well as other machine identification information, game usage data including the number of times a gaming license has been used, license expiration data and game owner identification information.

In 715, using the serial number of the gaming machine and the other machine identification information the remote server may identify the gaming machine. The serial number of the gaming machine is one example of an UID that may be used with the present invention. A table of gaming machine identification information may be stored on the remote server. From the gaming machine identification information, the remote server may be able to determine the type of gaming machine and the games available on the gaming machine. In 720, when appropriate, the remote server may generate a new gaming license for the gaming machine. If the game license request message includes a request for a gaming license not available on the gaming machine or not enabled for some reason on the gaming machine, then the gaming license request may be denied. In another example, the game license request may include game usage information for billing purposes and a new game license may not be required.

In 725, when a new game license is generated, the game license reply data including the new game license may be encrypted with a symmetric encryption key and the symmetric encryption key may be asymmetrically encrypted with a public key. In other cases, the game license reply message may include an acknowledgement that the message was received but may not include a new game license. In 730, the information regarding the game license request such as the machine identification information, a type of game license request (e.g. type of game), a time of the request and whether the request was granted may be stored on the remote server.

In 732, a game license reply message with the game license reply data may be generated. In 735, via a local ISP and the Internet, the game license reply message may be sent to the local server and/or the gaming machine. In 740, a billing request message based upon the game usage data contained in the game license request or the type of license requested may generated. In 745, the billing request message may be sent to the gaming machine owner identified in the gaming license request message.

Figure 8:
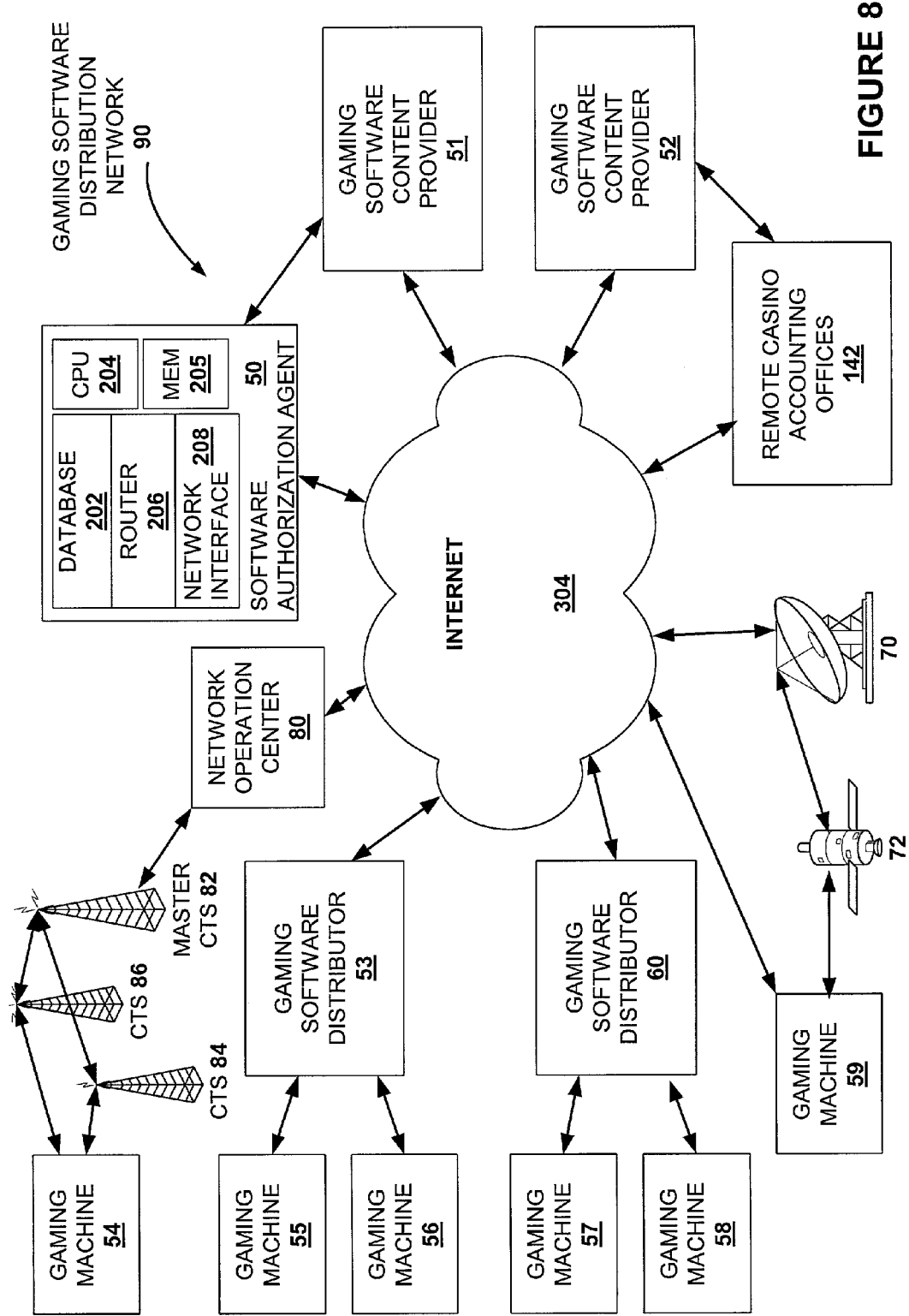
FIG. 8 is a block diagram of gaming software distribution network that uses a secure virtual network.

FIG. 8 is a block diagram of gaming software distribution network that uses a secure virtual network. In the present invention, gaming software may be transferred between various gaming devices, in a gaming software distribution network 90, after receiving authorization from a gaming software authorization agent 50. The gaming software authorization agent 50 may be a conventional data server including but not limited to a database 202, a router 206, a network interface 208, a CPU 204, a memory 205 and a firewall (not shown). The CPU 204 executes software to provide the functions of the authorization agent 50 as will be described below in more detail. In general, the gaming software authorization agent 50 approves all gaming software transactions between two gaming devices in the gaming software distribution network and stores a record of the gaming software transactions. Database 202 may be used to store gaming software transaction records. Details of the gaming devices and network connections used in the gaming distribution network 90 are described in FIG. 8. Details of the types of gaming software transaction that may be implemented in gaming software distribution network and the implementation of the transactions for some embodiments of the present invention are described with respect to FIGS. 9–14.

In the gaming industry, gaming software that is used to play a game of chance on a gaming machine is typically highly regulated to ensure fair play and prevent cheating. Thus, at any given time, it is important for a gaming regulatory entity to know what gaming software is installed on a gaming machine at any particular time. Currently, gaming software is often programmed into an EEPROM and installed on a gaming machine. When the EEPROM is installed in the gaming machine, it is manually checked by a representative of the gaming regulatory board prior to installation to ensure approved gaming software is being installed on the gaming machine. This process is time consuming and relatively inflexible. In the gaming industry, there is a desire to simplify the gaming software installation process so that gaming machine operators may more easily reconfigure gaming machines with different gaming software to respond to shifting customer tastes and demands.

The gaming software authorization agent 50 meets this need by allowing gaming software to be electronically transferred between gaming devices, such as game servers and gaming machines, in a manner that may be easily monitored and regulated. For instance, the software authorization agent 50 may be maintained or supervised by a gaming regulatory agency. However, the software authorization agent 50 may also be maintained by a gaming entity that controls many gaming properties to track software distributions on various gaming machines. In addition, besides monitoring electronic transfers of gaming software, the software authorization agent 50 may also be used to store a record of any change of gaming software on a gaming machine such as changes resulting from a manual installation of gaming software. For instance, a technician may manually load gaming software on to a gaming machine using a portable memory device storing the gaming software.

Details of gaming devices and the network connections in the gaming software distribution network are now described. In the present invention, gaming software may be transferred between gaming software providers, such as 51 and 52, gaming software distributors, such as 53 and 60, and gaming machines, such as 54, 55, 56, 57, 58 and 59. A gaming software provider may be a gaming device, such as a game server, that is maintained by a gaming software developer, such as IGT (Reno, Nev.), that develops gaming software for various gaming platforms. A gaming software content provider, such as 51 and 52, may maintain a plurality of gaming software titles, versions of gaming software titles and gaming software components that may be requested by another gaming device for an electronic download. The gaming software content provider may download gaming software to various customers after the customer has entered a licensing agreement with the content provider. Some details of obtaining game licenses for operating gaming software on a gaming machine have been described above with respect to FIGS. 6 and 7.

A set of gaming software components may be executed on a gaming machine to play a gaming of chance. The game of chance may include gaming software components used to play a bonus game in conjunction with the game of chance. Thus, a complete set of gaming software components used to play a game of chance may be downloaded or a portion of the gaming software components needed to play a game the game of chance may be downloaded. For instance, a complete package of gaming software components may be downloaded to replace a game executed on a gaming machine with a new game. As another example, a single game software component may be downloaded to fix an error in a game of chance executed on the gaming machine. In yet another example, a set of gaming software components may be downloaded to install a new graphical "feel" for the game of chance while other gaming software components for the game are not changed. In the present invention, any gaming device that stores gaming software for downloads may download a complete set of the gaming software components used to play the game of chance or portions of a complete set of the gaming software components. Some examples of gaming software components may include but are not limited to: 1) a banking modules for coin-in, coin-out, credits cards, fund transfers, 2) security modules for tracking security events such as door open, lost power, lost communication, 3) bet modules for handling betting configurations such as a number of paylines, a number of coins per line and denominations, 4) communication modules allowing a gaming device to communicate with other gaming devices using different communication protocols and 5) an operating system modules used in an operating system installed on the gaming machine. Details of some of the gaming software components that may be downloaded in the present invention are described in co-pending U.S. application Ser. No. 10/040,239, by LeMay et al., filed on Jan. 3, 2002 and titled "Game Development Architecture That Decouples The Game Logic From The Graphics Logic," which is incorporated herein in its entirety and for all purposes.

Gaming software related to other aspects of game play and operation of a gaming machine may also be authorized and downloaded using the methods and hardware of the present invention. For instance, device drivers used to operate a particular gaming device may be downloaded from a content provider or another gaming device. As another example, gaming software used to provide player tracking services and accounting services may be downloaded from a content provider or another gaming device. Even when the gaming software is not regulated by a gaming entity, it may be useful to perform the authorization process because the transaction records may be used to track the distribution of the gaming software on various gaming devices. The transaction records may be helpful to both providers of gaming software and operators of gaming devices in determining necessary upgrades and maintenance of gaming software on a gaming device such as a gaming machine.

A gaming software distributor, such as 53 and 60, may maintain a plurality of gaming software titles, versions of gaming software titles and gaming software components that may be transferred to another gaming device, such as a gaming device, for an electronic download. The gaming software distributors, such as 53 and 60, may be gaming devices, such as game servers, that are maintained by a gaming entity such as a casino. For instance, game server 53 may be operated by a first casino and game server 60 may be operated by a second casino. The game servers may store gaming software that has been licensed to the gaming entity from one or more gaming software providers such as 51 and 52. In one embodiment, a game server may also be a gaming machine. One example of a game server that may be used with the present invention is described in co-pending U.S. patent application Ser. No. 09/595,798, filed on Jun. 16, 2000, entitled "Using a Gaming Machine as a Server" which is incorporated herein in its entirety and for all purposes.

The game servers operated by a gaming entity may be used to provide gaming software to a plurality of gaming machines. For instance, game server 53 may be used to provide gaming software to gaming machine 54, 55, 56 and game server 60 may be used to provide gaming software to gaming machines 57, 58 and 59. In one embodiment, the game servers may be programmed to download gaming software in response to a software request on a gaming machine. For instance, a game player playing a game on a gaming machine, such as 55, may request to play a particular game of chance on the gaming machine 55 which is downloaded to the gaming machine from the game server 53. In another embodiment, the game servers, such as 53 and 60, may be used to update and reconfigure the gaming software on one or more gaming machines. For instance, the game server 53, may be used to regularly change the games of chance or bonus games of chance available for play on gaming machines 54, 55 and 56.

In the present invention, gaming software transferred between two gaming devices and communications between two gaming devices may use a variety of network architectures including but not limited to local area networks, wide area networks, private networks, a virtual private network, the Internet 304 and combinations thereof. Details of methods of using the Internet 304 in a secure manner have been described with respect with 3, 4, 5A and 5B.

In one embodiment, gaming software and other gaming information may be transferred between two gaming devices using a satellite connection. For instance, the gaming information transferred via satellite may include but is not limited to metering information generated on the gaming machine. In a gaming device using a satellite communication system, the gaming device is connected to a satellite dish. For instance, a gaming machine located in a store, as described with respect to FIG. 3, or a cruise ship may use a satellite connection. Two standard coaxial cables may connect the gaming device to the satellite dish. The gaming device, such as a gaming machine, may include a satellite modem to enable the satellite connection.

The satellite dish may send requests to the Internet 304 and receive Internet content via the satellite 72. The satellite 72, in turn, may communicate with a hub facility 70, which has a direct connection with the Internet 304. Typically, the transfer rate of information from the gaming device, such as gaming machine 59, to the satellite 72 (uplink rate) is less than the transfer of rate of information from the satellite 72 to the gaming device (downlink rate). For example, the uplink rate may be 28 Kilobytes per second while the downlink rate may be 500 kilobytes per second or higher. However, for software downloads, a high downlink rate may only be required for efficient gaming software downloads. Satellite Internet services may be provided by a company such as Starband Corporation (Mclean, Va.).

In another embodiment, gaming software and other gaming information may be transferred between two gaming devices using an RF connection. The gaming information transferred via the RF connection may include but is not limited metering information generated on the gaming machine. As one example, US Telemetry corporation (UTSC, Dallas, Tex.), uses radio frequency transmissions in the 218–222 MHz band to provide communications services to fixed end point devices as well as mobile devices. The fixed end point device may be a gaming machine located in a store or located in a casino, such as gaming machine 54, as well as a mobile gaming device such as a gaming machine located in a riverboat or portable gaming device that may be carried by a player and used to play a game of chance.

The RF network in a metropolitan service area may include cell transceiver sites or towers, such as 84 and 86, a system hub or master cell transceiver site, such as 82. The MCTS 82 is connected to a Network Operations Center (NOC) 80, which is essentially a data clearinghouse. Data is transferred from a CTS, such as 84 and 86, to a Master CTS (MCTS) 82 through a Publicly Switched Telephone Network. Data is transferred from the MCTS 82 to the NOC 80 database via an ATM or a Frame Relay. Data transfer protocol and user access to various end-point devices may be provided through web interfaces. Thus, using an RF network and the secured virtual network methods as described with respect to FIGS. 3, 4, 5A and 5B, gaming information as well as gaming software may be transferred between various gaming devices. For instance, a remote casino accounting office 142 may obtain information from gaming devices connected to the RF network via the Internet 304.

In the present invention, records of authorizations for the transfer of gaming software between gaming devices may be stored in the database 202. Thus, given an initial distribution of gaming software in the gaming software distribution network 90 for each gaming device, the gaming software authorization records may be used to track the gaming software distribution for gaming devices in the gaming distribution network as a function time. This tracking capability may be useful for various gaming entities such as a gaming regulatory board, a gaming software content provider and gaming operators. For instance, a gaming regulatory board may be able to see the gaming software installed on all gaming devices it regulates at any given time using the database 202. As another example, a gaming software content provider, such as 51 and 52, may be able to view gaming software requests for their gaming software products as a function of time. In yet another example, a remote casino accounting office 142 may be view the distribution of their gaming software on the gaming machine under their control.

The database 202 may be partitioned and include various security protocols to limit access of the data in transaction database according to various criteria. For instance, a gaming software provider 51 may be able to view records only of gaming software transactions involving their products but not of a competitors products. As another example, a gaming entity may be able to view records of gaming software transactions involving gaming machine that they operate but not view gaming software transactions for gaming machines that another competitor controls. Further details of an interface for providing gaming software distributions is described with respect to FIG. 15.

Figure 9:
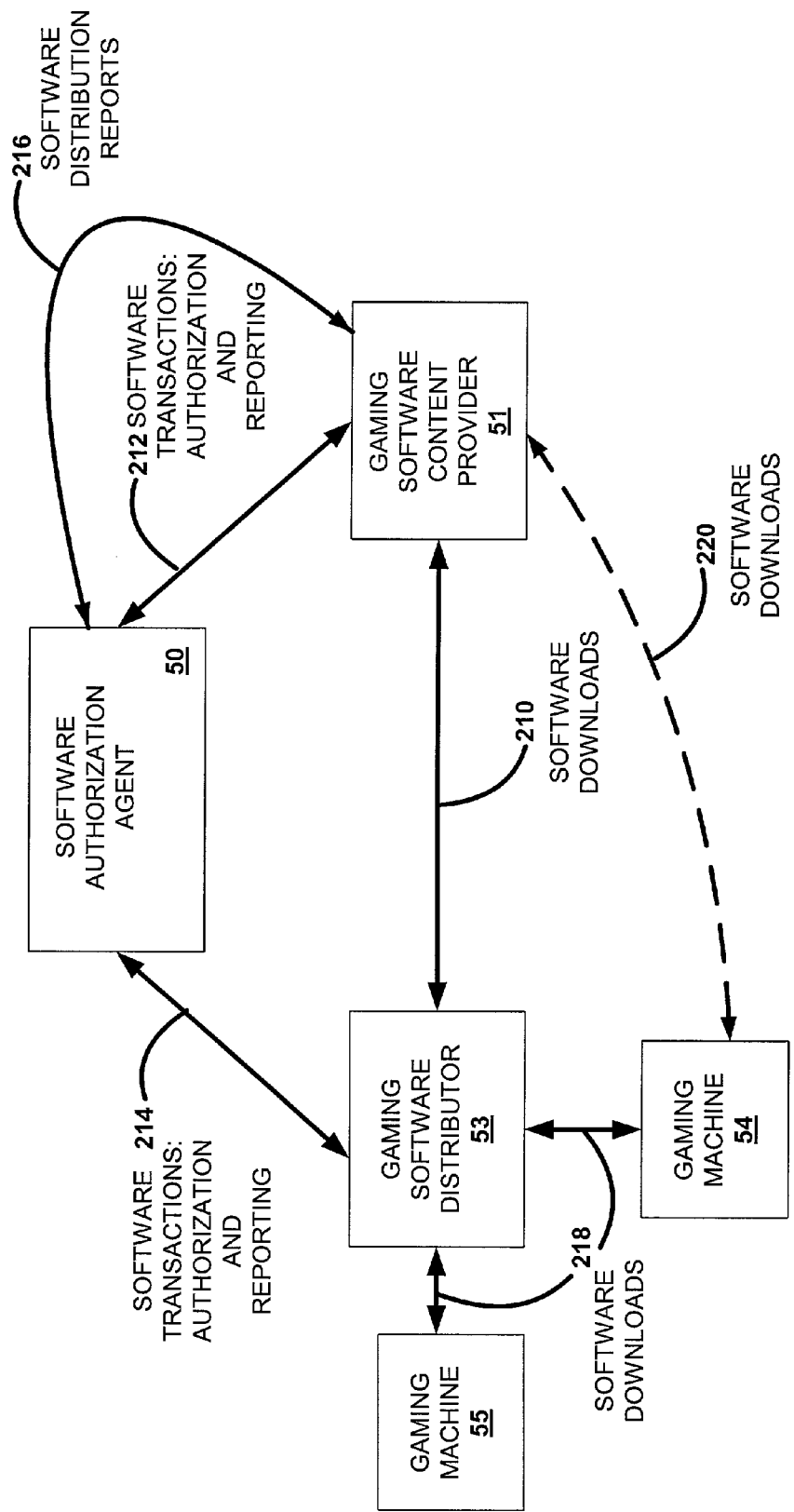
FIG. 9 is a block diagram depicting software transactions in a gaming software distribution network controlled by a software authorization agent.

FIG. 9 is a block diagram depicting software transactions in a gaming software distribution network controlled by a software authorization agent. Gaming software transactions between a software authorization agent 50, a gaming software distributor 53, a gaming software content provider 51 and two gaming machines, 54 and 55 in a gaming software distribution network are described. In FIG. 9, the number and types of gaming devices are provided for illustrative purposes only and the present invention is not limited to the gaming devices shown in the Figure.

As described with respect to FIG. 8, the software authorization agent 50 is used to authorize gaming software transfer between two gaming devices. For instance, in 214, the gaming software distributor 53, which may be a game server maintained by a casino, may contact the software authorization agent 50 to request a transfer of gaming software from the gaming software provider 51 to the gaming distributor 53. The gaming distributor may also contact the software authorization agent to request a transfer of gaming software from the gaming software provider 51 to another gaming device such as gaming machine. The software authorization agent 50 may approve or deny the request depending on the gaming software transaction information contained in the request. For instance, if a gaming device, such as the gaming software distributor 53, can not be identified and authenticated by the software authorization agent 50, then the software authorization agent 50 will deny the request for the transfer of gaming software. As another example, if the gaming device, has requested a software title that is unknown to the software authorization agent 50, then the software authorization agent will deny the request for the transfer of gaming software. Some details of this gaming software transaction are described with respect to FIGS. 11, 13 and 14.

After receiving authorization from the software agent, the gaming software distributor 53 may contact the gaming software content provider 51 and receive an electronically download of gaming software from the content provider via an electronic transfer in 210. The electronic transfer may use the network infrastructure and communication methods including encryption described with respect to FIGS. 3, 4, 5A, 5B and 8. Details of this gaming software transaction are described with respect to FIG. 11. The gaming software may also be manually shipped to the gaming software content distributor 53, such as through the mail or by a courier, and then locally loaded onto a gaming device.

In one embodiment of the present invention, gaming software transfers involving the actual transfer of gaming software occur directly between two gaming devices as shown in 210. In another embodiment of the present invention, gaming software transfers may be routed through the software authorization agent 50. For instance, to transfer gaming software to the gaming software distributor 53, the gaming software content provider 51 sends the gaming software to the software authorization agent 50 which then forwards the software to the gaming software distributor. When the software authorization agent 50 receives the gaming software it may perform one or more checks on the gaming software to insure it has been approved for use or just simply forward to the destination gaming device without additional checks. All or a portion of the gaming software transfers may be routed through the software authorization agent 50.

In 212, prior to downloading gaming software to the gaming distributor or any other gaming device, the gaming software content provider 51, which may be a game server maintained by a company that develops gaming software or owns the rights to gaming software, may validate the gaming software transaction with the software authorization agent 50. The gaming software content provider 51 may send gaming software transaction information received in a request for a transfer of gaming software received from a gaming device, such as the gaming software distributor 53, to the gaming software authorization agent 50. The software authorization agent 50 may use the gaming software transaction information to approve or reject the transfer of the gaming software. The details of this gaming software transaction are described with respect to FIG. 11.

After sending the gaming software to the gaming software distributor 53, the gaming software content provider 51 may report details of this transaction to the software authorization agent 50 in 212. For instance, the gaming software provider may generate a gaming software transaction receipt that includes a unique digital signature for the gaming software that was sent. Similarly, after receiving the gaming software from the gaming software content provider 51, the gaming software distributor 53 may report details of this transaction to the software authorization agent 50 in 214. For instance, the gaming software distributor 53 may generate a gaming software transaction receipt that includes a unique digital signature for the gaming software that was received. The software authorization agent 50 may compare receipts from the sender and the receiver of the gaming software to insure the correct gaming software has been transferred between the sender and the receiver.

The gaming software distributor 53 may be connected to a plurality of gaming machines and other gaming devices that use gaming software such as gaming machine 54 and 55. The connection between the gaming distributor 53 and the gaming machines, 54 and 55 may be a local area network within a casino but is not limited to local area network within a casino. In one embodiment, gaming software transferred from the gaming software provider may be targeted to a particular gaming machine, such as 55, and the gaming software distributor 55 may forward the gaming software to the gaming machine 55 after receiving it from the gaming software content provider 51. The gaming machine 55 may unpack the gaming software and calculate a digital signature. The digital signature may be sent to the gaming distributor 53 through the local area network and forwarded to the software authorization agent 50 to complete the transaction.

In another embodiment, after a request from a gaming software distributor 53, in 220, a gaming software content provider 51 may download gaming software directly to a gaming machine 54 bypassing the gaming software distributor 53. For example, a gaming software provider 51 may download software to a gaming machine located in a store as described with respect to FIG. 3 via a satellite connection described with respect to FIG. 8. The gaming machine may unpack the software, which may have been compressed, and send acknowledgements of the transfer directly to the gaming software content provider 51, the gaming software distributor and the software authorization agent.

In yet other embodiments, a game server, such as the gaming software distributor 53, may be used to reconfigure the gaming software on a group of gaming machines, such as 54 and 55 via software downloads 218. The game server 53 may transfer a plurality of gaming software titles from one or more gaming software content providers, such as 51 and store these titles on the game server. When the gaming software is transferred from the gaming software content provider, the gaming software content provider and the gaming software distributor may agree to a license (see FIGS. 6 and 7) that allows for a certain number of gaming software downloads over a specific period of time. A gaming machine operator controlling a number of gaming machine may use a game server storing the plurality of gaming software titles to regularly re-distribute gaming software on gaming machines. The redistribution of gaming software via electronic downloads may be performed automatically, i.e., a distribution pattern may be programmed into the game server. Also, gaming software programs may be distributed to a gaming machine via a request from the gaming machine. For instance, a player may request to play a certain game on the gaming machine and the game server may transfer the requested gaming software to the gaming machine.

The transfer of gaming software from the game server to the gaming machine may require an approval from the software authorization agent 50. Further, even if the an approval is not required, gaming software transaction information may be sent to the software authorization agent so that the gaming software residing on any gaming machine at a particular time may be known. Details of a gaming software transaction between a gaming machine 54, a game server 53 and software authorization agent 50 are described with respect to FIG. 12.

The present invention is not limited to only electronic transfers of gaming software between gaming devices. The authorization methods may be also be applied to the manual installation of gaming software. For example, prior to manually installing gaming software on a gaming machine, an installation technician may request approval of the gaming software transaction from a software authorization agent 50 using a hand-held wireless device. The gaming software, which may be stored on a memory device such as CD-ROM may been shipped to gaming machine operator. Gaming software information regarding the gaming software to be manually installed on a gaming machine and information regarding the gaming machine may be entered into the hand-held wireless device and then sent to the software authorization agent. The software authorization agent may use this information to approve the gaming software transaction and to track the gaming software installed on gaming machines.

In another example, a technician may use the software authorization agent to manually check gaming software installed on a gaming machine. The technician may read gaming software information from a particular gaming machine and then using a hand-held wireless device relay the gaming machine software information and gaming machine information to the software authorization agent 50. The software authorization agent 50 may compare the information received from the hand-held wireless device with gaming software information stored in a gaming software registration database to determine whether the gaming machine has the correct software installed on it. The software authorization agent may send a message to the hand-held wireless gaming device indicating whether or not the correct gaming software is installed on a gaming machine. Further, the gaming software registration database may contain information regarding what software is installed on a particular gaming machine and what gaming software upgrades are available. When performing gaming machine maintenance, a gaming machine operator may request this information from the software authorization agent 50 to aid in the maintenance process.

Gaming software may be transferred between two gaming devices using a wireless communication connection. For example, within a casino, a game server may download gaming software to a plurality of gaming machines using a wireless network located within the casino. In another example, gaming software may be downloaded from a hand-held device to a gaming machine using an infrared communication interface. Examples of wireless communication standards that may be supported by a wireless communication connection and associated hardware/software include but are not limited to Bluetooth, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, HomeRF and IrDA. Wireless communications may also be performed using cellular communication technologies with cellular communication standards used in the cellular communication industry.

As described with respect to FIG. 8, the software authorization agent 50 may include a gaming software transaction database. The gaming software transaction database may be used to track the distribution of gaming software on various gaming machines. For instance, in 216, a gaming software content provider may request a report regarding downloads of their gaming software from game servers to gaming machines. The software authorization agent 50 may receive the request, query the gaming software transaction database and generate a report for the gaming software content provider. This type of report may also be generated for a casino operator with many game servers distributed over gaming properties. Advantages of the gaming software transaction database is that it may provide an electronic data trail for billing, security, auditing, dispute resolution, game usage and market trending involving the transfer and the use of gaming software.

Figure 10:
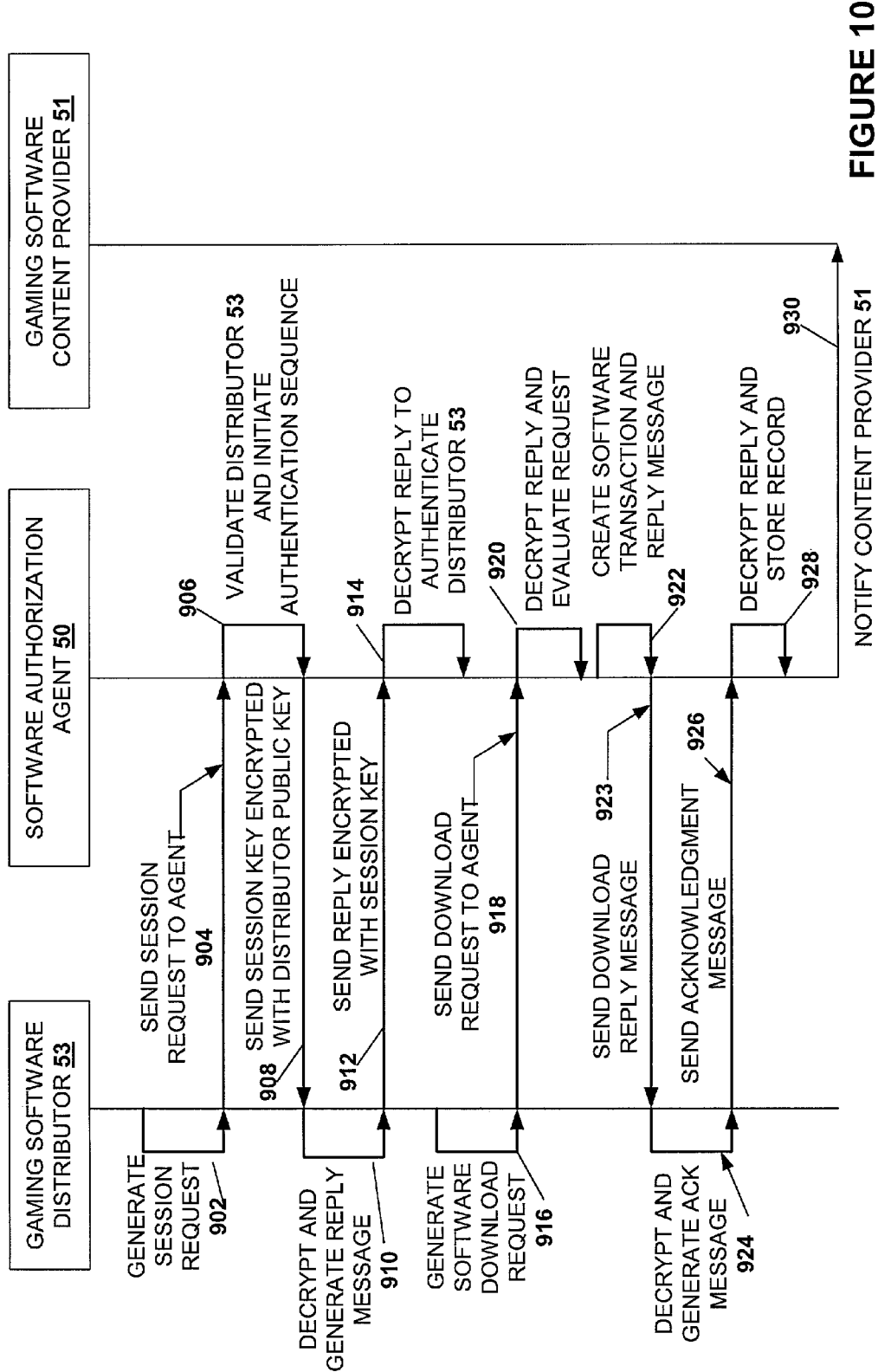
FIG. 10 is an interaction diagram between a gaming software distributor, gaming software provider and a software authorization agent depicting an initialization of a gaming software transaction.

FIG. 10 is an interaction diagram between a gaming software distributor 53, gaming software provider 51 and a software authorization agent 50 depicting an initialization of a gaming software transaction for one embodiment of the present invention. The example is provided for illustrative purposes only. A number of operations used to perform a given function in the gaming software transaction process, an order of the operations and information used in each operation may be varied and is not limited to the examples described with respect to FIGS. 10–15.

In 902, the distributor 53 generates a session request message for the transfer of gaming software and sends the session request message to the agent 50. The initial session request message may comprise gaming software information that is used by the agent 50 to authenticate the identity of the gaming device requesting the session. For instance, prior to beginning the session request, the distributor 53 and the agent 50 may have exchanged public encryption keys and other security information that may be used to establish the identity of the sender of a message to the agent 50 and to identify messages sent from the agent 50. Details of exchanging encryption keys in a secure manner which may be applied to the present invention are described in co-pending U.S. application Ser. No. 09/993,163, by Rowe et al., filed Nov. 16, 2001 which is now U.S. Pat. No. 6,866,586, and entitled "A Cashless Transaction Clearinghouse," which are incorporated herein by reference in its entirety and for all purposes. The message request may also include additional information that is used in a later software transfer request such as a software title, information regarding the sender of the gaming software and information regarding the receiver of the gaming software. The additional information may be used by the agent 50 after the identity of the session requestor has been authenticated.

In 906, the agent 50 receives the session request message from the distributor 53. The agent 50 may attempt to validate the distributor 53 by checking information about the distributor 53, such as its licensing status and access status to the agent 50. Transfers s of gaming software may be a revocable privilege that is granted to a gaming operator. Thus, status checks of session requestor may be necessary. When the session requester, e.g., the distributor has been validated, the agent may initialize an authentication sequence.

In 908, the agent 50 may send an authentication message containing a symmetric encryption key, K(M). K(M) is stored by the agent 50. A symmetric encryption key is used to decrypt information encrypted with the symmetric encryption key. The authentication message including K(M) and any other additional information is encrypted with a public encryption key, M(P), used by the distributor 53. M(P) was previously received, authenticated and stored by the agent 50. The public encryption key M(P) is part of a public-private asymmetric encryption key pair comprising M(P) and M(PP), where only the distributor 53 should have knowledge of the private key. In an asymmetric encryption key pair, only the private key of the encryption public-private key pair may be used to decrypt information encrypted with the public key.

In 910, when the distributor 53 receives the authentication message, it decrypts the message with its private key, M(PP) which corresponds to the public encryption key M(P). In 912, the distributor 53 generates and sends an acknowledgement message encrypted with K(M). In 914, when the agent 50 receives the acknowledgement message, it decrypts it with the session key K(M) stored in 906. Since only the distributor has the private key M(PP) needed to decrypt K(M), when a correct acknowledgement message is received, the distributor 53 is authenticated. The agent 50 may generate and send an additional message acknowledging the distributor has been authenticated and may now proceed with a gaming software download request.

In 916 and 918, the distributor 53 may generate a software download request message and send it to the agent. The download request message may include combinations of gaming software transaction information selected from but not limited to: a) operator identification information for the gaming device to receive the gaming software, b) machine identification information for the gaming device to receive the gaming software (e.g., an identification number for a gaming machine or a game server), c) operator identification information for the gaming device that is to send the gaming software, d) machine identification information for the second gaming device, e) a gaming software title or gaming software titles to be transferred, f) a gaming software provider identifier such as a name of a company (e.g., IGT), g) a gaming software version number, h) a gaming software identification number and i) information on gaming software currently installed on the gaming device to receive the gaming software. The download request message may be encrypted with symmetric encryption key, K(M). In addition, the download request message may be encrypted with the public encryption key of the agent 50. In one embodiment, the agent 50 may send a request to a gaming device requesting the software currently installed on the gaming device for tracking and regulatory purposes. Further, once it is determined what gaming software is installed on a plurality of gaming machine, the process of upgrading and fixing errors in gaming software may be simplified.

In 920, the agent 50 receives the download request message, decrypts the message and evaluates the request. In one embodiment, the download request information may be included in the session request message sent in 904. Thus, after authenticating and identity of the distributor 53, the agent 50 may begin processing the request in 920 without receiving additional information from the distributor 53. To evaluate the download request, the agent 50 may compare gaming software transaction information in the request message with information stored in a database. For instance, the request message may include a location, address and identification number for a gaming device that is to receive the gaming software. The agent 50 may compare this information with information from a database containing information for gaming devices that are allowed to receive gaming software downloads. The agent 50 may only authorize the download request when the gaming device identification information in the request message matches the gaming device identification information stored in the database. In another example, the request message may include gaming software identification information such as a title, version number and manufacturer. The agent 50 may only authorize the download request when the gaming software identification information in the request message matches gaming software identification information contained in a database used by the agent 50.

In 922, when the download request is approved, the software authorization agent creates a gaming software transaction record and stores the record to a gaming software transaction database. The gaming software transaction record may include but is not limited to gaming software transaction information such as: a) a symmetric encryption key, K(S), that will be used to transfer the gaming software from a first gaming device to a second gaming device, b) a time that the transaction was initiated, c) transaction expiration time, d) a destination ID number (e.g., a number identifying a casino), e) an identification number of the gaming device on which the software is to be installed, f) a gaming software identification number, g) a software title, h) a game signature for the gaming software such as from a CRC or a hash, i) a manufacturer's identification number, j) a public encryption key used by the manufacturer and k) a transaction number for the record. In some embodiments, the gaming software transaction record may include a number of permitted downloads of the gaming software. For instance, a gaming software program may be loaded to a game server. Each time the game server downloads the gaming software to a gaming machine, it may request permission from the software authorization agent 50 using the transaction number in the original record. The software authorization agent may authorize the game server to download the software to a gaming machine as long as the number of permitted downloads has not been exceeded.

In 922 and 923, the software authorization agent may send an approval message with all or a portion of the gaming software transaction information stored in the gaming software transaction record to the gaming software distributor. The message may be encrypted with the session key, K(M), generated in 906. In 924, the distributor 53 may receive the message, decrypt it using the session key, K(M), and generate an acknowledgement message. In 926, the software distributor 53 may send the acknowledgement message to the authorization agent 50. In 928, the authorization agent 50 may receive the acknowledgement and store the record for the gaming software transaction. In 930, the gaming software agent may send a notification message to the gaming software provider 51. The message may notify the gaming software content provider 51 that a gaming software transaction has been authorized that allows some of the provider's 51 to be transferred to another gaming device.

Figure 11:
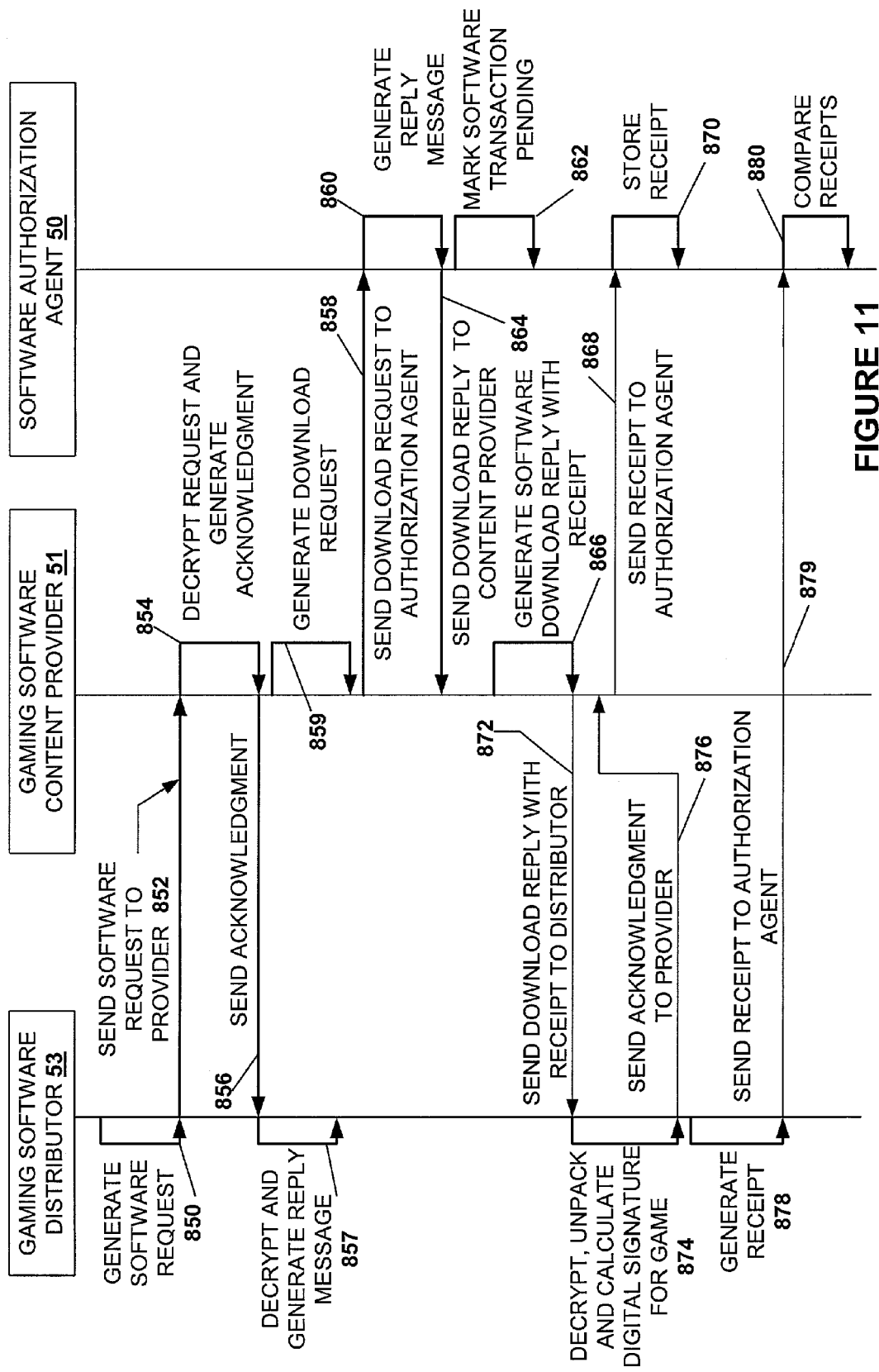
FIG. 11 is an interaction diagram between a gaming software distributor, a gaming software provider and a software authorization agent depicting a gaming software transaction.

FIG. 11 is an interaction diagram between a gaming software distributor, a gaming software provider and a software authorization agent depicting a gaming software transaction. In 850, the distributor may generate a software download request message. The download request message may include gaming software transaction information generated in the gaming software transaction request described with respect to FIG. 10. The download request message may also include a session key, K(S), encrypted with the provider's public encryption key. In 852, the distributor 53 sends the request to the provider 51. In 854, the provider 51 receives the message and decrypts the session key, K(S), with the provider's private encryption key. In 854, the provider generates an acknowledgement message encrypted with the session key K(S). In 856, the provider 51 sends the message to the distributor 53. In 857, the distributor receives the message and decrypts it with the K(S) received from the software authorization agent 50 in the authorization message.

In 859, the software provider 51 may optionally generate a download request message to validate the gaming software transaction requested by the distributor. The download request message may include gaming software transaction information, such as a transaction number, received from the distributor 53. In 858, the provider 51 may optionally send the download request message to the authorization agent 50. The message may be encrypted with the agent's public encryption key. In 860, the agent 50 may receive the download request message from the provider, decrypt it and compare the gaming software transaction information in the message with a gaming software transaction information stored in a gaming software transaction record corresponding to the request. When the request is valid, the agent 50 may generate a download reply message authorizing the provider 51 to transfer the gaming software. When the request is invalid, the agent 50 may generate a download reply message requesting the provider 51 not to send the gaming software to the distributor 53. In 864, the agent sends the download request message to the provider 51. In 862, the agent may store a record of the download request and whether it was authorized or not authorized.

In 866, the provider 51 may generate a download reply with a receipt. In one embodiment, the download reply may require the authorization of the agent 50. In another embodiment, the download reply may be sent without approval from the agent 50. The download reply may include but is not limited to a game package with the following information: 1) the requested game software, 2) the expiration date of the game or a number of plays until expiration which may be built into the gaming software, 3) a destination machine number (in some embodiments, the gaming software may be designed to operate only on a particular machine), 4) a destination address (e.g., a casino name), 5) a time stamp for the transaction, 6) a digital signature generated for the game (e.g., a CRC or a Hash of the game software), 7) the transaction number received from the distributor. The download reply may also include a separate receipt including but not limited to the following information: a) game title or identification number, b) original game transfer request data received in the request from the distributor 53, c) destination machine's identification number, d) destination address and e) a transaction number.

The download reply may be compressed to reduce the information transferred. The download reply may also include information regarding the compression algorithm used so that the destination device may properly uncompress the download reply. The download package and the download receipt may be encrypted with combinations of a public encryption key used by the destination gaming device and the session encryption key, K(S). In one embodiment, the download package and reply may be routed through the software authorization agent 50 which may perform checks on the gaming software before forwarding it to the destination gaming machine. Thus, the download package and receipt may be encrypted with the public encryption key used by the software authorization agent 50.

The download package and the download receipt may go to separate gaming devices. In one embodiment, the download package may be forwarded by the distributor 53 to a destination gaming device such as a gaming machine and the receipt may be forwarded to another gaming device for accounting purposes. In another embodiment, the receipt and download package may go to the same gaming device such as a game server operated by the gaming software distributor 53. In 868, the content provider 51 may send a receipt encrypted with the session key, K(S) to the agent 50. Since only the provider 51 and the distributor have the session key, K(S), the identity of the provider 51 may be authenticated. In 870, the agent 50 may receive the receipt, decrypt it and store gaming software transaction information contained in the receipt.

In 872, the provider sends the download reply with the gaming software and receipt to the distributor 53. In 874, the distributor 53 receives the download message, the message may be forwarded to a destination gaming device or may be stored on a game server. The destination gaming device may decrypt the download message, unpack the gaming software, which may include uncompressing the gaming software, and generate a digital signature for the gaming software. The digital signature may be generated using an algorithm such as a CRC or a Hash. In 876, the destination gaming device may send an acknowledgement message to provider indicating it has received the download message with the gaming software.

In 878, the gaming software distributor 53 generates a receipt. The receipt may include but is not limited to the following information: a) game title or identification number, b) original game transfer request data received in the request from the agent, c) destination machine's identification number, d) destination address and e) a transaction number. The receipt may be encrypted with the session encryption key, K(M), exchanged between the agent 50 in the distributor as described with respect to FIG. 10. Thus, when the agent 50 receives the receipt and decrypts it with K(M), the identity of the distributor may be authenticated.

In 879, the distributor 53 sends the receipt to the agent 50, the agent decrypts the receipt. In 880, the agent 50 may compare gaming software transaction information in the receipt received from the provider 51 in 868 with gaming software transaction information from the receipt received from the distributor 53 in 879. For example, to validate the gaming software transaction, the agent 50 may compare the digital signature for the gaming software received from the provider 51 in the receipt with the digital signature for the gaming software received from the distributor 53. When the digital signatures match, the gaming software transaction is completed and communications are terminated. As an additional check, the agent may compare the digital signatures for the gaming software with a digital signature for an approved copy of the gaming software stored in a database maintained by the agent 50. When the transaction is complete, the agent 50 may store a record of the transaction in a database. As described with respect to FIG. 9, the database may be used to track the distribution of gaming software on various gaming devices that use the authorization agent 50. Also, the records may be used for billing and auditing purposes.

In 880, when gaming software transaction information in the receipts does not match, the agent 50 may send messages to the provider 51 and the distributor 53 revoking the transaction. The message to the provider 51 may be encrypted with the session key, K(S) and the message to the distributor 53 may be encrypted with the session key, K(M). The messages may also be encrypted with public keys of public-private key pairs used by the distributor 53 and the provider 51. In response to receiving the revocation message, the content provider 51 and the distributor 53 may repeat the transaction. For example, the digital signatures for the gaming software may not match because of a transmission error. In another embodiment, the entire gaming software transaction may be revoked and the distributor 53 may have to initiate an entirely new transaction as was described with respect to FIG. 9.

Figure 12:
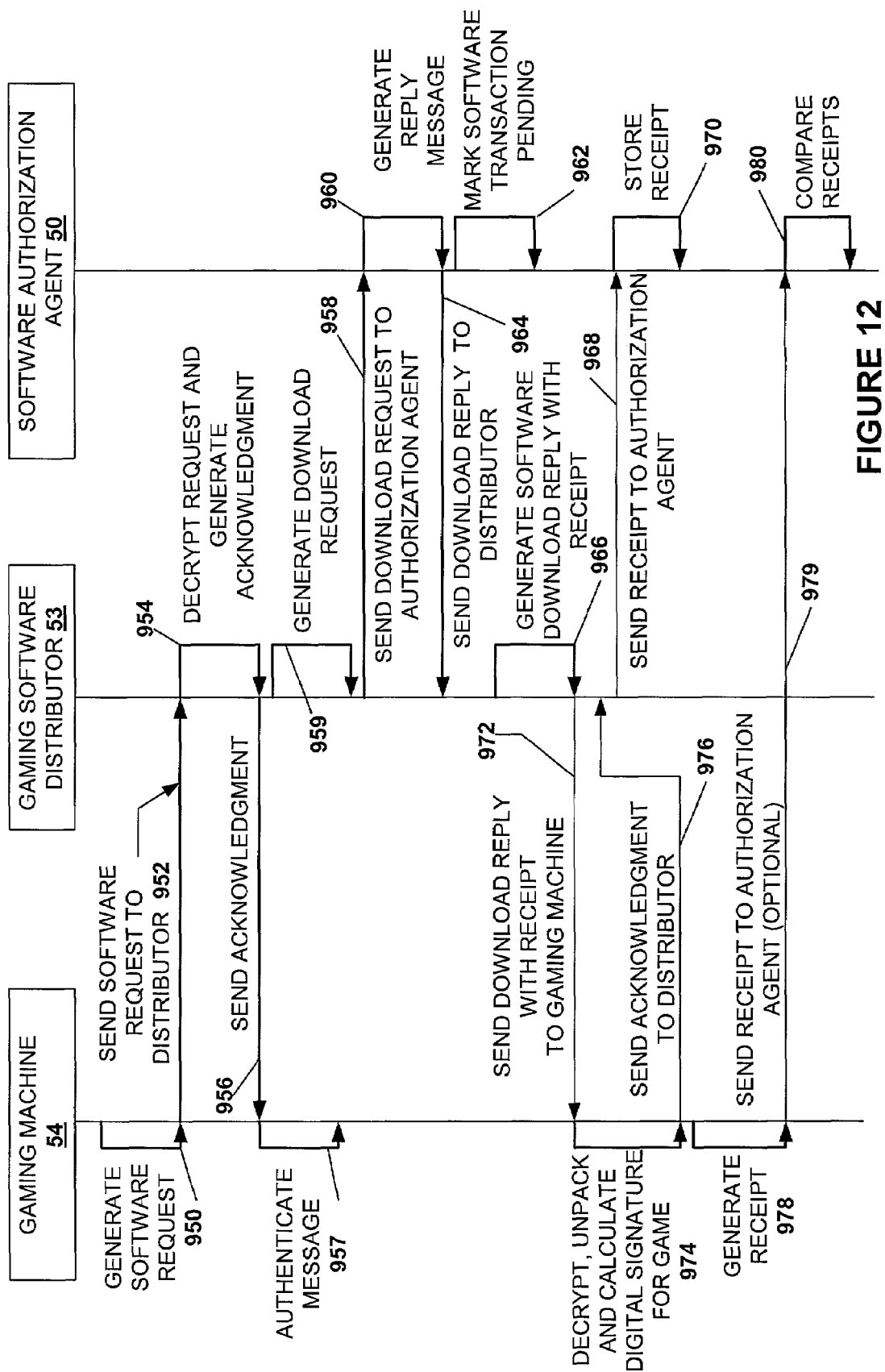
FIG. 12 is an interaction diagram between a gaming software distributor, a gaming machine and a software authorization agent depicting a gaming software transaction.

FIG. 12 is an interaction diagram between a gaming software distributor 53, a gaming machine 54 and a software authorization agent 50 depicting a gaming software transaction. In this example, the distributor 53 may be a game server operated by a casino and the gaming machine 54 may be one of a plurality of gaming machine in communication with the gaming server. The game server may have been loaded with gaming software provided by various content providers using gaming software transactions as described with respect to FIG. 11. In general, the operations shown in FIG. 12 are similar to those described with respect to FIG. 11.

In 950, the gaming machine 54 may generate a gaming software request. The gaming software request may be in response to different gaming events that occur on the gaming machine. For example, a request may be initiated when a game player using the gaming machine requests to play a game of chance currently not installed on a gaming machine. As another example, the gaming machines may include software programs that request gaming software at particular times of the day or the week. For instance, particular bonus games may only be provided on the gaming machines at certain times of the day to increase player interest. In yet another example, a software request may be generated when a game license (see FIGS. 6 and 7) installed on a gaming machine has expired.

In 952, the gaming machine 54 sends the software transfer request to the distributor 53 which in this case is a game server. In 954, the distributor 53 receives the gaming software request message and generates an acknowledgement message. The message may or may not be decrypted. When the gaming machine and the game server communicate via a private local area network, such as within a casino, encryption procedures may not be necessary. However, the game server may communicate with a gaming machine located at different gaming properties, such as stores, via a virtual private network, as was described with respect to FIG. 3. In this case, encryption procedures such as the use of public-private key pairs and symmetric encryption keys may be used. In 956, the distributor 53 sends the acknowledgement message to the gaming machine 54. In 957, the gaming machine 54 receives the acknowledgement message and may authenticate the sender of the message.

In another embodiment of the present invention, the gaming software download request may be initiated by the game server. For example, the game server may be used to regularly redistribute gaming software on gaming machine distributed on a gaming floor according to perceived customer desires and market trends. A market trend may be a "hot" game that is desired by a lot of customers. Further, the gaming server may be also used to provide regularly software upgrades and error fixes to gaming software executed on various gaming machines. The software upgrades and error fixes may be prompted by notices of upgrades and fixes received from a content provider. When the distributor 53 initiates the gaming software transaction, the gaming machine 54 may be simply sent the gaming software. An authentication process may or may not proceed the game server sending the gaming software to the gaming machine.

In 959, the distributor 53 may generate a download request message for the requested gaming software. The request message may have been initiated by the gaming machine 54 or the distributor 53. In 958, the distributor sends the download request to the agent 50. In 960, the agent 50 may generate a reply message that authorizes or denies the transaction and store a record of the gaming software transaction 962. In some embodiments, the distributor 53 may simply send a record of the gaming software transaction to the agent but not ask for or expect an approval message from the agent 50. The agent 50 may store this record. In another embodiment, the agent 50 may have previously approved a certain number of gaming software transfers and may determine if additional downloads are available.

In 964, the distributor receives the download reply from the agent 50. When an authorization has been requested and it has been approved, the gaming distributor 53 may generate a download reply message containing the gaming software. In this embodiment, a receipt may not be required since the gaming software downloaded to the gaming distributor may have already been approved by the agent 50 in a previous gaming software transaction. In 972, the download reply with the gaming software is sent to the gaming machine 54. In 974, the gaming machine receives the download reply and may decrypt and unpack the gaming software. The gaming machine may also calculate one or more digital signatures for the gaming software which may be used to validate that the software has been successfully transferred. In 976, the gaming machine 54 may send an acknowledgement message to the game server of the distributor 53 that it has received the requested gaming software. The gaming machine 54 may also store a gaming software transaction record of the gaming software download in a non-volatile memory device. The gaming software transaction record may be used for used for auditing and security purposes.

Optionally, in 978, the gaming machine 54 may generate a receipt or some other type of acknowledgement message that it has received the gaming software and send it to the authorization agent 50. In 968, the game server of the distributor 53 may also send a receipt or acknowledgement message to the agent 50. In 970 and 980, the agent 50 may receive the acknowledgement messages from the gaming machine 50 and the distributor 53 and store a record of the gaming software transaction. The agent may also use gaming software transaction information included with the acknowledgement messages to determine if the gaming software transaction has been correctly carried out.

Figure 13:
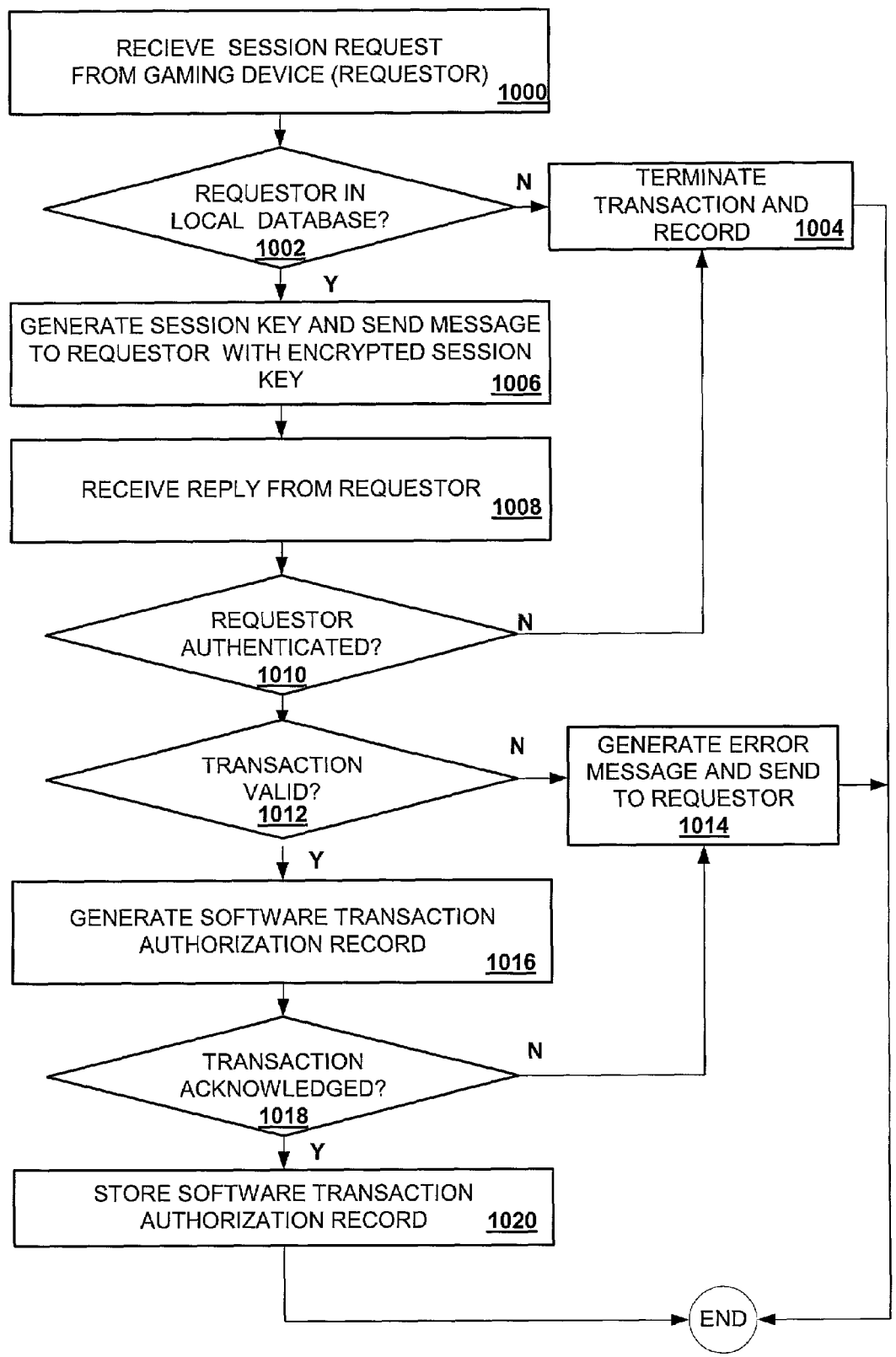
FIG. 13 is flow chart depicting a method in a software authorization agent initializing a gaming software transaction.

FIG. 13 is flow chart depicting a method in a software authorization agent initializing a gaming software transaction. In 1000, the agent receives a gaming software transaction session request message from a gaming software distributor or another gaming entity desiring a transfer of gaming software. The transfer of gaming software may be implemented electronically or manually. In a manual transmission, the gaming software may be shipped to the distributor and loaded locally onto a gaming device, such as a gaming machine. In 1002, the authorization may check to determine if the requestor identified in the message is in a local of database of gaming entities that are authorized to request transfers of gaming software. When the requestor is not in the database, in 1004, the agent may terminate the transaction and generate a record of the attempted transaction and store the record. Records of failed transactions may be analyzed for security purposes.

When the requestor is in a local database, the agent may generate a symmetric encryption key that may be used to encrypt messages sent between the agent and the requester and store the symmetric encryption key. Further, for authentication purposes, the agent may encrypt the symmetric encryption key with a public encryption key used by the requestor and send a message with the encrypted symmetric encryption key to the requestor. In one embodiment, prior to the session request, the requester and the agent may have exchanged public encryption keys of public-private encryption key pairs. In 1008, the agent receives a reply message from the requester. The message may contain a symmetric encryption key encrypted with the agents public key. The agent decrypts the symmetric encryption key with the agent's private key.

In 1010, the agent compares the symmetric encryption key to the symmetric encryption key sent to the requestor in 1006. When the encryption keys agree, the identity of the requestor is assumed to be authenticated. In addition to a symmetric encryption key, other types of information, such as passwords or random bits, may be encrypted and exchanged between the requester and agent. The other types of exchanged information may be compared as part of the authentication process. When the requestor is not authenticated, in 1004, the transaction is terminated and a record of the failed transaction may be generated.

When the identity of the requestor is authenticated, in 1012, the agent may evaluate and validate one or more parts of a download request for gaming software from the requestor. For instance, the agent may determine if a requested gaming software title has been approved for downloads or transfers. As another example, the download request may include identification information for a gaming device that will receive the requested gaming software. The agent may compare identification information for the destination gaming device with identification information from a database of gaming devices approved for receiving gaming software. In 1014, when the information in the download request is not valid, the agent may generate an error message and it to the requester. The error message may indicate detected errors in the request such as missing information or a request for a gaming software title unknown to the agent.

In 1016, when information in the download request has been validated, the agent may generate an authorization record for the gaming software transaction as previously described with respect to FIG. 9. The agent may also generate an acknowledgement message and send it to the requestor. In 1018, the agent may check to determine whether a reply has been received for the acknowledgement message. In 1014, when an acknowledgement reply message has not been received, the agent may generate an error message and send it to the requestor. In 1020, when the acknowledgement reply message has been received, the agent may store a record of the authorized transaction to a database. In one embodiment, the agent may also notify a software content provider that has been authorized to transfer the gaming software of the pending gaming software transaction that has been authorized.

Figure 14:
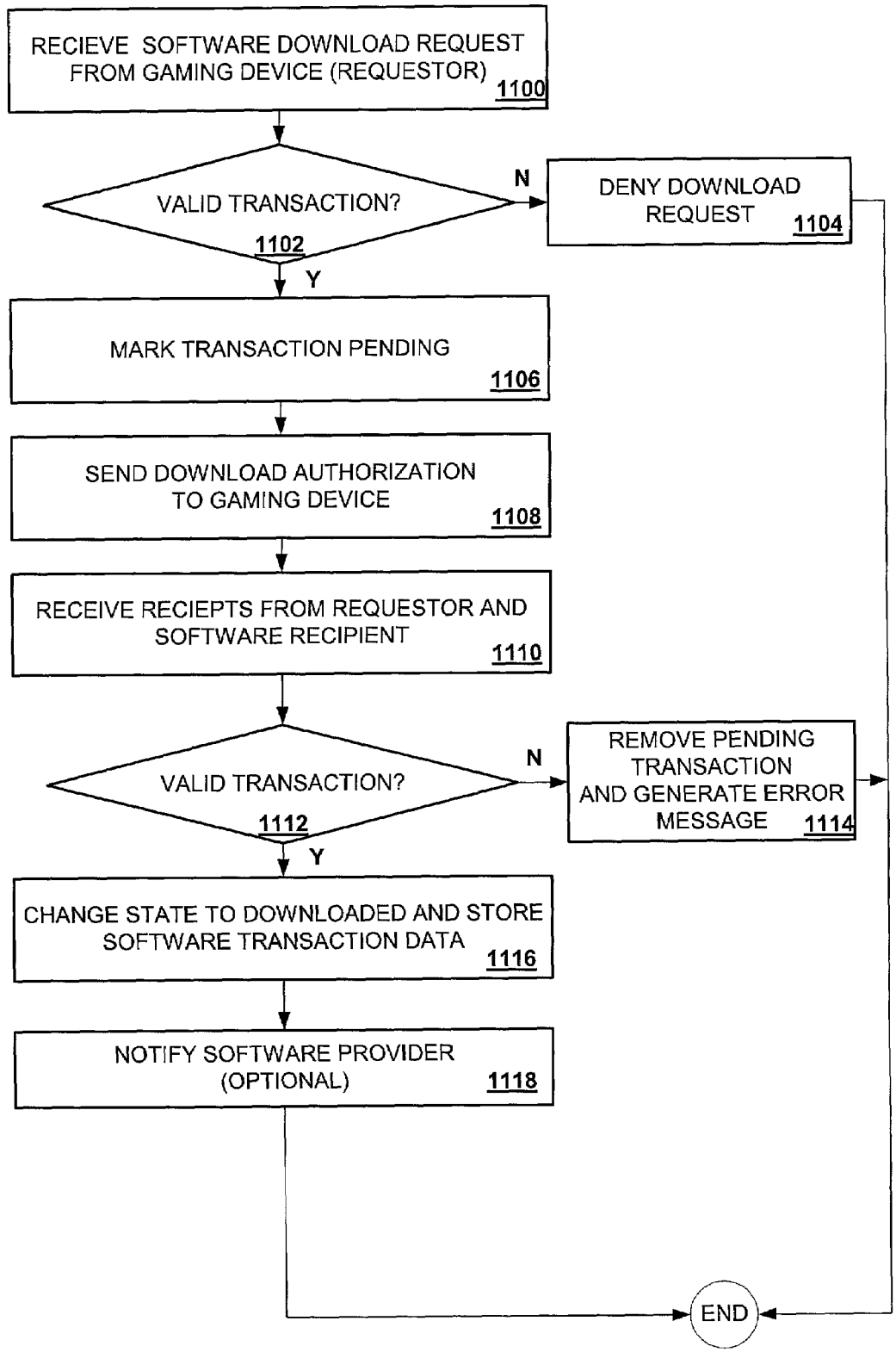
FIG. 14 is flow chart depicting a method in a software authorization agent of authorizing a gaming software transaction.

FIG. 14 is flow chart depicting a method in a software authorization agent of authorizing a gaming software transaction. In 1100, the agent receives a gaming software transfer request form a gaming device. The transfer request may describe a gaming software transaction previously generated and authorized by the agent. The gaming device may be a game server, a gaming machine or any other gaming device that is allowed to receive gaming software. Further, the gaming device may request a transfer of the gaming software to another gaming device different from itself. For instance, a game server may request a transfer of gaming software to a gaming machine. In 1102, the agent may determine whether the transfer request is a valid gaming software transaction. For example, the transfer request may contain a transaction number and the agent may use this transaction number to locate a gaming software transaction record including gaming software transaction information describing the transaction. The agent may compare the information from the gaming software transaction record with gaming software transaction information contained in the transfer request. The transaction record may also include status information such as whether the transaction has been completed or is pending and an expiration date for the transaction, which may be checked by the agent.

In 1104, when the gaming software transaction is invalid the agent denies the transfer request, may send an error message and may also store a record of the denied transfer request. In 1106, when the gaming software transaction has been validated, the agent may change the status of the transaction to pending and store the status. In 1108, the agent may send a transfer reply to the gaming device requesting the gaming device to proceed with the transaction. In 1110, the agent may receive acknowledgement messages from the gaming device that has sent the gaming software (e.g., a content provider) and from the gaming device that has received the gaming software (e.g., a gaming machine or a game server). The acknowledgement messages may include information about the transferred gaming software. For example, the acknowledgement message may include a digital game signature for the gaming software generated by the both the sender and the receiver of the gaming software.

In 1112, the agent may validate the transaction by comparing gaming software transaction information received from both the receiver and the sender of the gaming software. For instance, the agent may compare digital signatures for the gaming software generated by the sender and the receiver. In 1114, when the transaction is invalid, the agent may change the status of the transaction from pending and generate an error message. The error message may be sent to the requestor of the gaming software and the sender of the gaming software and identify any deficiencies detected by the agent. In 1116, when the transaction is valid, the agent may change the status of the transaction to downloaded and store additional information in the transaction record such as the time that the transaction was completed. In 1118, the agent may optionally notify the requestor of the gaming software and the provider of the gaming software that the transaction has been successfully completed. In some embodiments, the agent may even bill the requestor of the gaming software and arrange for an electronic fund transfer or other payment method.

Figure 15:
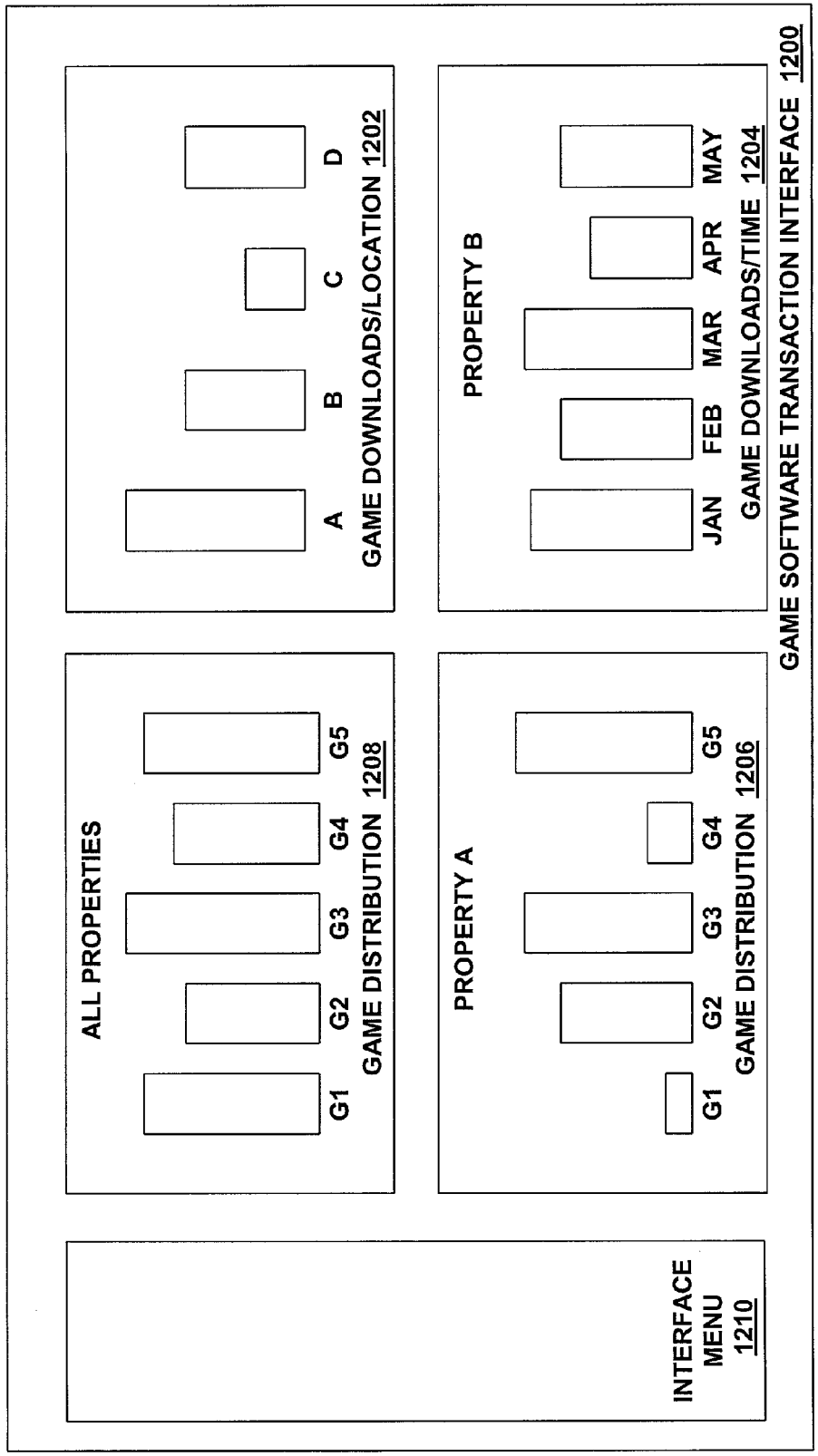
FIG. 15 is a block diagram of an interface used to provide information about gaming software transactions generated by a software authorization agent.

FIG. 15 is a block diagram of an interface 1200 used to provide information about gaming software transactions generated by a software authorization agent. The interface menu 1210 may allow a user to view information in different formats, perform queries of a gaming software transaction and perform other operations on gaming software transaction data such as analyzing market trends. The interface may be used from a remote site to access gaming software transaction stored in a database. The access to the gaming software transaction database may be limited according to the identity of a particular user. For example, a gaming regulatory agency maintaining the transaction database may be able to look at all of the gaming software transactions stored in a database. A gaming software content provider may be able to access transactions involving the transfer of their gaming software. A gaming entity such as a casino operator may be able to access transactions involving gaming devices operated by the casino.

In 1202, 1204, 1206 and 1208, a few examples of plots that may be derived form a gaming software transaction database are shown. The plots are shown for illustrative purposes only and are not limited to the examples shown in the figure. In 1202, a total number of game downloads as a function of location are shown. This type of plot may be generated for a gaming entity with gaming devices at locations A, B, C and D or even a content provider that provides gaming software to each of these locations via gaming software transactions. In 1204, a number of game downloads as a function of time are plotted for property A. The plot shows the variation in game downloads from month to month. In 1206, a gaming software distribution for five different types of games at property A are shown. As described with respect to FIG. 9, if an initial distribution of gaming software on different gaming devices are known, then the gaming software transaction records may be used to track the distribution of games on the gaming devices. In 1208, a game distribution for the five different types of games is shown across multiple gaming properties.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. In a software authorization agent, a method of generating a gaming software transaction record used to facilitate a transfer of gaming software between two gaming devices, the method comprising:
   receiving a gaming software transaction request from a first gaming device;
   authenticating an identity of the first gaming device;
   generating a gaming software transaction record comprising gaming software transaction information that is used to approve or reject the transfer of gaming software from a second gaming device to the first gaming device
   sending an authorization message to the first gaming device wherein the authorization message includes information indicating whether the first gaming device is authorized to transfer the gaming software to the second gaming device and wherein the first gaming device and the second gaming device are separate from the software authorization agent;
   wherein the gaming software is for at least one of a) a game of chance played on a gaming machine, b) a bonus game of chance played on a gaming machine, c) a device driver for a for a device installed on a gaming machine, d) a player tracking service on a gaming machine and e) an operating system installed on the gaming machine.

2. The method of claim 1, wherein the game of chance is a video slot game, a mechanical slot game, a lottery game, a video poker game, a video blackjack game, a video lottery game, and a video pachinko game.

3. The method of claim 1, wherein the first gaming device is at least one of a gaming machine, game server and combinations thereof.

4. The method of claim 1, wherein the gaming software transaction request comprises access information and gaming software identification information.

5. The method of claim 4, wherein the access information is one or more of operator identification information for the first gaming device, machine identification information for the first gaming device, operator identification information for the second gaming device and machine identification information for the second gaming device.

6. The method of claim 4, wherein the gaming software identification information is one or more of a gaming software title, a gaming software provider identifier, a gaming software version number and a gaming software identification number.

7. The method of claim 1, further comprising:
   comparing access information in the gaming software transaction request with access information stored in a database.

8. The method of claim 7, when the compared access information does not match the access information stored in the database,
   denying the gaming software transaction request.

9. The method of claim 1, further comprising: comparing gaming software identification information in the gaming software transaction request with gaming software identification information stored in a database.

10. The method of claim 9, when the gaming software identification information does not match the access information stored in the database,
    denying the gaming software transaction request.

11. The method of claim 1, further comprising:
    generating an identification sequence;
    encrypting the identification sequence with a public encryption key for the first gaming device wherein information encrypted with the public encryption key is decrypted with a private encryption key used by the first gaming device;
    sending the encrypted identification sequence to the first gaming device.

12. The method of claim 11, wherein the identification sequence is a symmetric encryption key used to encrypt gaming software transferred between the first gaming device and the second gaming device.

13. The method of claim 11, further comprising:
    receiving from the first gaming device a second identification sequence encrypted with a public encryption key used by the software authorization agent,
    decrypting the second identification sequence with a private encryption key corresponding to the public encryption key used by the software authorization agent;
    comparing the second identification sequence to the identification sequence sent to the first gaming device to authenticate the identity of the first gaming device.

14. The method of claim 13, wherein the second identification sequence is a symmetric encryption key used to transfer gaming software between the first gaming device and the second gaming device.

15. The method of claim 13, when the second identification sequence received from the first gaming device does not match the identification sequence sent to the first gaming device;
    denying the gaming software transaction request.

16. The method of claim 1, wherein the gaming transaction information is one or more of a transaction encryption key, a transaction number, a time stamp, a transaction expiration time, a destination identifier, a machine identification number, a gaming software identification number, a gaming software provider identifier, a transaction number, a number of allowable downloads and combinations thereof.

17. The method of claim 1, further comprising:
    storing the gaming transaction record information to a transaction database.

18. The meted of claim 1, further comprising:
    sending gaming software transaction information to the first gaming device.

19. The method of claim 18, wherein the gaming software transaction information is one or more of a one or more of a transaction encryption key, a public encryption key used by the second gaming device, a transaction number, a time stamp, a transaction expiration time, a destination identifier, a destination machine identification number, a gaming software identification number, a gaming software provider identifier, a number of allowable downloads, a transaction number and combinations thereof.

20. The method of claim 1, further comprising:
    sending a notification message to a gaming software provider identified in the gaming software request of a pending gaming software download request.

21. The method of claim 1, wherein the software authorization agent communicates with the first gaming device using an local area network, a wide area network, a private network, a virtual private network, the Internet and combinations thereof.

22. The method of claim 1, wherein the software authorization agent and the first gaming device communicate with another using at least one of a satellite communication connection, a RF communication connection and an infrared communication connection.

23. The method of claim 1, wherein the transfer of gaming software is performed at least one of manually and electronically.

24. The method of claim 1, wherein the gaming software comprises one or more gaming software components for the game of chance, the bonus game of chance, the device driver, the player tracking service and the operating system.

25. The method of claim 1, wherein the gaming software is used to upgrade a gaming software component on the first gaming device.

26. The method of claim 1, wherein the gaming software is used to correct an error in a gaming software component on the second gaming device.

27. The method of claim 1, further comprising:
requesting a list of gaming software installed an a gaming device.

28. In a software authorization agent, a method of regulating a transfer of gaming software between two gaming devices, the method comprising:
receiving a gaming software download request message with gaming software transaction information from a first gaming device;
validating the gaming software download request using the gaming software transaction information;
sending an authorization message to the first gaming device wherein the authorization message includes information indicating whether the first gaming device is authorized to transfer the gaming software to a second gaming device and wherein the first gaming device and the second gaming device are from the software authorization agent;
wherein the gaming software is for at least one of a) a game of chance played on a gaming machine, b) a bonus game of chance played on a gaming machine, c) a device driver for a for a device installed on a gaming machine, d) a player tracking service on a gaming machine and e) an operating system installed on a gaming machine.

29. The method of claim 28, wherein the second gaming device is at least one of a game server and a gaming machine.

30. The method of claim 28, wherein the game of chance is a video slot game, a mechanical slot game, a lottery game, a video poker game, a video blackjack game, a video lottery game, and a video pachinko game.

31. The method of claim 28, wherein the gaming transaction information is one or more of a transaction encryption key, a transaction number, a time stamp, a transaction expiration time, a destination identifier, a machine identification number for the first gaming device, a machine identification number for the second gaming device, a gaming software identification number, operator information for the first gaming device, operator information for the second gaming device, a transaction number and combinations thereof.

32. The method of claim 28, further comprising:
comparing the gaming transaction information in the gaming software download request message with gaming transaction information stored in a transaction database to validate the gaming software download request.

33. The method of claim 28, further comprising:
sending a message to the first gaming device denying authorization for the first gaming device to transfer gaming software to the second gaming device.

34. The method of claim 28, further comprising:
decrypting the download request message.

35. The method of claim 28, further comprising:
receiving a first download acknowledgement message from the first gaming device and receiving a second download acknowledgement message from the second gaming device.

36. The method of claim 35, further comprising:
comparing gaming software transaction information in the first download acknowledgement message with gaming software transaction information in the second download acknowledgement message to validate that the gaming software has been correctly transferred.

37. The method of claim 36, wherein the gaming software transaction information in the first download acknowledgement message includes at least a first digital signature determined for the gaming software and the gaming software transaction information in the second download acknowledgement message includes at least a second digital signature determined for the gaming software.

38. The method of claim 28, wherein the first gaming device a game server in communication with one or more gaming machines and the second gaming device is a gaming machine.

39. The method of claim 28, wherein the first gaming device is a game server maintained by a gaming software provider and the second gaming device is a game server in communication with one or more gaming machines.

40. The method of claim 28, wherein the first gaming device is a game server maintained by a gaming software provider and the second gaming device is a gaming machine.

41. The method of claim 28, wherein the software authorization agent, the first gaming device and the second gaming device communicate with one another a local area network, a wide area network, a private network, a virtual private network, the Internet and combinations thereof.

42. The method of claim 28, wherein the software authorization agent the first gaming device and the second gaming device communicate with another using at least one of a satellite communication connection, a RF communication connection and an infrared communication connection.

43. The method of claim 28, further comprising:
receiving the gaming software from the first gaming device;
validating the gaming software; and
sending the gaming software to the second gaming device.

44. The method of claim 43, further comprising:
determining a digital signature for the gaming software; and
comparing the digital signature with an approved digital signature for the gaming software stored in a database to validate the gaming software.

45. The method of claim 28, further comprising:
storing gaming software transaction information indicating that a status of the download request.

46. The method of claim 28, wherein the status is at least one of authorized, pending, completed and void.

47. The method of claim 28, wherein the transfer of gaming software is preformed at least one of manually and electronically.

48. The method of claim 28, wherein the gaming software comprises one or more gaming software components for the game of chance, the bonus game of chance, the device driver, the player tracking service and the operating system.

49. The method of claim 28, wherein the gaming software is used to upgrade a gaming software component on the second gaming device.

50. The method of claim 28, wherein the gaming software is used to correct an error in a gaming software component on the second gaming device.

51. The method of claim 28, further comprising:
requesting a list of gaming software installed on a gaming device.

52. In a software authorization agent, a method of providing gaming software transaction information, the method comprising:
receiving a gaming software transaction information request from a gaming device;
authenticating an identity of the gaming device;
querying a gaming software transaction database for a set of gaming software transaction information requested by the gaming device, said gaming software transaction database comprising a plurality of records of gaming software transactions wherein each gaming software transaction is related to a request to authorize a transfer of gaming software received by the software authorization agent; and
sending the requested gaming software transaction information to the gaming device;
sending an authorization message to a first gaming device wherein the authorization message includes information indicating whether the first gaming device is authorized to transfer the gaming software to a second gaming device and wherein the first warning device and the second gaming a device are separate from the software authorization agent;
wherein the gaming software is for at least one of a) a game of chance played on a gaming machine, b) a bonus game of chance played on a gaming machine, c) a device driver for a for a device installed on a gaming machine, d) a player tracking service on a gaming machine and e) an operating system installed on a gaming machine.

53. The method of claim 52,
wherein each gaming software transaction record includes gaming software transaction information that describes a transfer of gaming software from a first gaming device to a second gaming device.

54. The method of claim 52,
wherein the gaming software transaction database includes a record of gaming software installed on one or more gaming devices.

55. The method of claim 52, wherein the gaming software transaction database includes a record of gaming software usage on one or more gaming devices.

56. The method of claim 52, wherein the gaming transaction information is one or more of a transaction number, a time stamp, a transaction expiration on time, a destination identifier, a machine identification number for the first gaming device, a machine identification number for the second gaming device, a gaming software identification number, operator information for the first gaming device, operator information for the second gaming device, a transaction number and a transaction completion time.

57. The method of claim 52, further comprising:
generating a gaming transaction report that presents the set of gaming software transaction requested by the gaming device.

58. The method of claim 52, further comprising:
generating a distribution of gaming software on a plurality of gaming machines at a specified time using the gaming software transaction information stored in the gaming software transaction database.

59. The method of claim 52, further comprising:
generating a distribution of gaming software on a plurality of gaming machines for a plurality of times using the gaming software transaction information stored in the gaming software transaction database.

60. Tho method of claim 52, further comprising:
generating a billing report.

61. The method of claim 60, further comprising:
generating a fee for the billing report based upon a number of times a first gaming software has been used on the gaming device.

62. The method of claim 61, wherein a usage fee charged each time the first gaming software is used varies with time.

63. The method of claim 52, further comprising:
requesting a list of gaming software installed on the gaming device.

64. The method of claim 63, further comprising:
storing the list of gaming software installed on the gaming device to the gaming software transaction database.

65. In a first gaming device, a method of requesting a transfer of gaming software from a second gaming device, said method comprising:
generating a gaming software transaction request;
sending the gaming software transaction request to a gaming software authorization agent that approves or rejects the transfer of gaming software from the second gaming device; and
receiving an authorization message from the gaming software authorization agent wherein the authorization message includes information indicating whether the first gaming device is authorized to transfer the gaming software to the second gaming device and wherein the first gaming device and the second gaming device are separate from the gaming software authorization agent;
wherein the gaming software is for at least one of a) a game of chance played on a gaming machine, b) a bonus game of chance played on a gaming machine, c) a device driver for a for a device installed on a gaming machine d) a player tacking service on a gaming machine and e) an operating system installed on a gaming machine.

66. The method of claim 65, wherein the gaming software authorization agent, the first gaming device and the second gaming device communicate with one another a local area network, a wide area network, a private network, a virtual private network, the Internet and combinations thereof.

67. The method of claim 65, wherein the gaming software authorization agent, the first gaming device and the second gaming device communicate with another using at least one of a satellite communication connection, a RF communication connection and an infrared communication connection.

68. The method of claim 65, wherein the gaming software transaction request comprises access information and gaming software identification information.

69. The method of claim 68, wherein the access information is one or more of operator identification information for the first gaming device, machine identification information for the first gaming device, operator identification information for the second gaming device and machine identification information for the second gaming device.

70. The method of claim 68, wherein the gaming software identification information is one or more of a gaming software title, a gaming software provider identifier, a gaming software version number and a gaming software identification number.

71. The method of claim 65, wherein the gaming software transaction information is one or more of a one or more of a transaction encryption key, a public encryption key used by the second gaming device, a transaction number, a time stamp, a transaction expiration time, a destination identifier, a destination machine identification number, a gaming software identification number, a gaming software provider identifier, a number of allowable downloads, a transaction number and combinations thereof.

72. The method of claim 65, wherein the game of chance is a video slot game, a mechanical slot game, a lottery game, a video poker game, a video blackjack game, a video lottery game, and a video pachinko game.

73. The method of claim 65, further comprising:
sending authentication information used to identify the first gaming device to the gaming software authorization agent.

74. The method of claim 65, further comprising:
sending a message requesting the gaming software to the second gaming device.

75. The method of claim 65, further comprising:
receiving the gaming software from the second gaming device.

76. The method of claim 75, further comprising:
determining a digital signature for the gaming software and
sending a message with at least the digital signature to the gaming software authorization agent.

77. The method of claim 65, further comprising:
authenticating an identity of the second gaming device.

78. The method of claim 65, wherein the first gaming device is a gaming machine and the second gaming device is a game server.

79. The method of claim 65, wherein the first gaming device is a game server in communication with a plurality of gaming machines and the second gaming device is a game server maintained by a gaming software content provider.

80. The method of claim 65, wherein the transfer of gaming software is preformed at least one of manually and electronically.

81. The method of claim 65, wherein the gaming software comprises one or more gaming software components.

82. The method of claim 65, wherein the gaming software is used to upgrade a gaming software component on the gaming machine.

83. The method of claim 65, wherein the gaming software is used to correct an error in a gaming software component on the gaming machine.

84. In a first gaming device, a method of transferring gaming software to a second gaming device, said method comprising:
receiving a gaming software transaction request from the second gaming device;
sending the gaming software transaction request to a gaming software authorization agent that approves or rejects the transfer of gaming software;
receiving an authorization message from the gaming software authorization agent wherein the authorization message includes information indicating whether the first gaming device is authorized to transfer the gaming software to the second gamma device; and
transferring the gaming software to the second gaming device;

wherein the gaming software is for at least one of a) a game of chance played on a gaming machine, b) a bonus game of chance played on a gaming machine, c) a device driver for a for a device installed on a gaming machine, d) a player tracking service on a gaming machine and e) an operating system installed on a gaming machine.

85. The method of claim 84, further comprising:
receiving an approval of the gaming software transaction request from the gaming software authorization agent.

86. The method of claim 84, further comprising:
prior to transferring the gaming software, receiving a denial of the gaming software transaction request from the gaming software authorization agent; and
terminating the transfer of the gaming software.

87. The method of claim 84, wherein the software authorization agent; the first gaming device and the second gaming device communicate with one another a local area network, a wide area network, a private network, a virtual private network, the Internet and combinations thereof.

88. The method of claim 84, wherein the software authorization agent, the first gaming device and the second gaming device communicate with another using at least one of a satellite communication connection, a RF communication connection, an infrared communication connection and combinations thereof.

89. The method of claim 84, wherein the gaming software transaction request comprises access information and gaming software identification information.

90. The method of claim 89, wherein the access information is one or more of operator identification information for the flit gaming device, machine identification information for the first gaming device, operator identification information for the second gaming device and machine identification information for the second gaming device.

91. The method of claim 89, wherein the gaming software identification information is one or more of a gaming software title, a gaming software provider identifier, a gaming software version number and a gaming software identification number.

92. The method of claim 84, wherein the gaming software transaction information is one or more of a one or mare of a transaction encryption key, a public encryption key used by the second gaming device, a transaction number, a time stamp, a transaction expiration time, a destination identifier, a destination machine identification number, a gaming software identification number, a gaming software provider identifier, a number of allowable downloads, a transaction number and combinations thereof.

93. The method of claim 84, wherein the game of chance is a video slot gain, a mechanical slot game, a lottery game, a video poker game, a video blackjack game, a video lottery game, and a video panchinko game.

94. The method of claim 84, further comprising:
determining a digital signature for the gaming software and
sending a message with at least the digital signature to the gaming software authorization agent.

95. The method of claim 84, wherein the first gaming device is a gaming server and the second gaming device is a gaming machine.

96. The method of claim 84, wherein the first gaming device is a gaming machine and the second gaming device is a gaming machine.

97. The method of claim 84, wherein the first gaming device is a game server maintained by a gaming software content provider and the second gaming device is a game server maintained by a gaming entity.

98. The method of claim 84, wherein the first gaming device is a game server maintained by a gaming software content provider and the second gaming device is a gaming machine maintained by a gaming entity.

99. The method of claim 84, wherein the transfer of gaming software is performed at least one of manually and electronically.

100. The method of claim 84, wherein the gaming software comprises one or more gaming software components.

101. The method of claim 84, wherein the gaming software is used to upgrade a gaming software component on to gaming machine.

102. The method of claim 84, wherein the gaming software is used to correct an error in a gaming software component on the gaming machine.

103. A software authorization agent for facilitating the transfer of gaming software between a plurality of gaming devices, the software authorization agent comprising:
- a network interface allowing the authorization agent to communicate with each of the plurality of gaming devices; and
- a processor configured at designed to (i) receive gaming software transfer requests via the network interface from a first gaming device for the transfer of gaming software from the first gaming device to a second gaming device (ii) approve or reject the gaming software transaction request; and iii) send an authorization message to the first gaming device wherein the authorization message includes information indicating whether the first gaming device is authorized to transfer the gaming software to a second gamma device;
- wherein, the gaming software is for at least one of a) a game of chance played on a gaming machine, b) a bonus game of chance played on a gaming machine, c) a device driver for a for a device installed on a gaming d) a player tracking service on a gaming machine and e) an operating system installed on a gaming machine.

104. The software authorization agent of claim 103, further comprising:
- a transaction database containing gaming software transaction information.

105. The software authorization agent of claim 104, wherein the gaming software transaction information is one or more of a transaction number, a time stamp, a transaction expiration time, a destination identifier, a machine identification number for the first gaming device, a machine identification number for the second gaming device, a gaming software identification number, operator information for the first gaming device, operator information for the second gaming device, a transaction number and a transaction completion time.

106. The software authorization agent of claim 105, further comprising a memory containing software allowing the processor to analyze the gaming software transaction information stored in the transaction database and generate gaming software distribution reports based upon the gaming software transaction information.

107. The software authorization agent of claim 105, further comprising:
- a memory containing software allowing the processor to analyze the gaming software transaction information stored in the transaction database and generate gaming software billing reports based upon the gaming software transaction information.

108. The software authorization agent of claim 103, further comprising:
- a database storing public encryption keys for one or more of the plurality of gaming devices.

109. The software authorization agent of claim 103, further comprising:
- a database storing identification information for one or more of the plurality of gaming devices.

110. The software authorization agent of claim 103, further comprising:
- a database storing identification information for the gaming software that is transferred from the second gaming device to the third gaming device.

111. The software authorization agent of claim 110, wherein the identification information for the gaming software is a digital signature, a title, a manufacturer, an identification number and combinations thereof.

112. The software authorization agent of claim 103, wherein the first gaming device is a hand-held computing device and the second gaming device is a gaming machine.

113. The software authorization agent of claim 103, wherein the first gaming device is a first gaming machine and the second gaming device is a second gaming machine.

114. The software authorization agent of claim 103, wherein the first gaming device is a first game server and the second gaming device is a second game server.

115. The software authorization agent of claim 103, wherein the first gaming device is a first game server and the second gaming device is a gaming machine.

116. The software authorization agent of claim 103, wherein the game of chance is a video slot game, a mechanical slot game, a lottery game, a video poker game, a video black jack game, a video lottery game, and a video pachinko game.

117. The software authorization agent of claim 103, wherein the software authorization agent, the first gaming device and, the second gaming device communicate with one another a local area network, a wide area network, a private network, a virtual private network, the Internet and combinations thereof.

118. The software authorization agent of claim 103, wherein the software authorization agent the first gaming device and, the second gaming device communicate with another using at least one of a satellite communication connection, a RF communication connection and an infrared communication connection.

119. The software authorization agent of claim 103, wherein the transfer of gaming software is performed at least one of manually and electronically.

120. The software authorization agent of claim 103, wherein the gaming software comprises one or more gaming software components.

121. The software authorization agent of claim 103, wherein the gaming software is used to upgrade a gaming software component on one of the gaming devices.

122. The software authorization agent of claim 103, wherein the gaming software is used to correct an error in a gaming software component on one of the gaming devices.

123. A first gaming device comprising:
- a network interface allowing communications between the first gaming device, a software authorization agent and one or more other gaming devices; and
- a processor configured or designed to (i) send a request for the transfer of gaming software from the first gaming device to a second gaming device via the network interface to the software authorization agent (ii) receive an authorization message from the software authorization agent wherein the authorization message includes information indicating whether the first gaming device is authorized to transfer the gaming software to the second gaming device and wherein the first gaming device and the second gaming device are separate from the software authorization agent;

wherein the gaming software is for at least one of a) a game of chance played on a gaming machine, b) a bonus game of chance played on a gaming machine, c) a device driver for a for a device installed on a gaming machine, d) a player tracking service on a gaming machine and e) an operating system installed on a gaming machine.

124. The first gaming device of claim 123, further comprising:
a memory device that stores gaming software.

125. The first gaming device of claim 123, further comprising:
a master gaming controller that controls a game of chance played on the first gaming device.

126. The first gaming device of claim 123, further comprising:
a memory device that stores public encryption keys for one or more of the plurality of gaming devices and the software authorization agent.

127. The first gaming device of claim 123, wherein the network interface is connected to at least one of a local area network, a wide area network, a private network, a virtual private network, the Internet and combinations thereof.

128. The first gaming device of claim 123, wherein the network interface provides at least one of a satellite communication connection, a RF communication connection and an infrared communication connection.

129. The first gaming device of claim 123, wherein the first gaming device is a portable gaming device.

130. The first gaming device of claim 123, wherein the first gaming device is a first gaming machine and, the second gaming device is a second gaming machine.

131. The first gaming device of claim 123, wherein the first gaming device is a first game server and, the second gaming device is a second game server.

132. The first gaming device of claim 123, wherein the first gaming device is a first game server and, the second gaming device is a gaming machine.

133. The first gaming device of claim 123, wherein the game of chance is a video slot game, a mechanical slot game, a lottery game, a video poker game, a video blackjack game, a video lottery game, and a video pachinko game.

134. The first gaming device of claim 123, wherein the gaming software comprises one or more gaming software components.

135. The first gaming device of claim 123, wherein the gaming software is used to upgrade a gaming software component on one of the gaming devices.

136. The first gaming device of claim 123, wherein the gaming software is used to correct an error in a gaming software component on one of the gaming devices.

* * * * *

UNITED STATES PATENT AND TRADEMARK OFFICE
CERTIFICATE OF CORRECTION

| | |
|---|---|
| PATENT NO. | : 7,168,089 B2 |
| APPLICATION NO. | : 10/116424 |
| DATED | : January 23, 2007 |
| INVENTOR(S) | : Nguyen et al. |

It is certified that error appears in the above-identified patent and that said Letters Patent is hereby corrected as shown below:

In the Specification:

Column 4, line 32, change "gaining" to --gaming--.

In the Claims:

In line 1 of claim 18 [column 42, line 44] change "meted" to --method--.

In line 2 of claim 27 [column 43, line 18] change "an a" to --on a--.

In line 14 of claim 28 [column 43, line 33] change "are from" to --are separate from--.

In line 2 of claim 47 [column 44, line 64] change "preformed" to --performed--.

In line 21 of claim 52 [column 45, line 32] change "warning" to --gaming--.

In line 3 of claim 56 [column 45, line 56] delete "on".

In line 1 of claim 60 [column 46, line 11] change "tho" to --the--.

In line 20 of claim 65 [column 46, line 44] change "tacking" to --tracking--.

In line 2 of claim 80 [column 47, line 42] change "preformed" to --performed--.

In line 13 of claim 84 [column 47, line 65] change "gamma" to --gaming--.

In line 3 of claim 90 [column 48, line 32] change "flit" to --first--.

In line 2 of claim 92 [column 48, line 42] change "mare" to --more--.

In line 2 of claim 93 [column 48, line 51] change "gain" to --game--.

In line 4 of claim 93 [column 48, line 53] change "panchinko" to --pachinko--.

In line 2 of claim 101 [column 49, line 13] change "on to" to --on the--.

In line 7 of claim 103 [column 49, line 24] change "at designed" to --or designed--.

UNITED STATES PATENT AND TRADEMARK OFFICE
CERTIFICATE OF CORRECTION

| | |
|---|---|
| PATENT NO. | : 7,168,089 B2 |
| APPLICATION NO. | : 10/116424 |
| DATED | : January 23, 2007 |
| INVENTOR(S) | : Nguyen et al. |

It is certified that error appears in the above-identified patent and that said Letters Patent is hereby corrected as shown below:

In the Claims (continued):

In line 16 of claim 103 [column 49, line 33] change "gamma" to --gaming--.

Signed and Sealed this

Eleventh Day of December, 2007

JON W. DUDAS
*Director of the United States Patent and Trademark Office*